United States Patent
Jaker et al.

(10) Patent No.: US 10,059,053 B2
(45) Date of Patent: Aug. 28, 2018

(54) BREAK-AWAY SUPPORT MATERIAL FOR ADDITIVE MANUFACTURING

(71) Applicant: Stratasys, Inc., Eden Prairie, MN (US)

(72) Inventors: Vittorio L. Jaker, New Brighton, MN (US); Luke M. B. Rodgers, Chaska, MN (US)

(73) Assignee: Stratasys, Inc., Eden Prairie, MN (US)

( * ) Notice: Subject to any disclaimer, the term of this patent is extended or adjusted under 35 U.S.C. 154(b) by 676 days.

(21) Appl. No.: 14/532,485

(22) Filed: Nov. 4, 2014

(65) Prior Publication Data
US 2016/0122541 A1    May 5, 2016

(51) Int. Cl.
| | |
|---|---|
| *B29C 64/40* | (2017.01) |
| *C08L 81/06* | (2006.01) |
| *B29C 64/118* | (2017.01) |
| *C08L 81/00* | (2006.01) |
| *C08L 71/12* | (2006.01) |

(Continued)

(52) U.S. Cl.
CPC ............ *B29C 64/40* (2017.08); *B29C 64/106* (2017.08); *B29C 64/118* (2017.08); *C08L 71/12* (2013.01); *C08L 81/00* (2013.01); *C08L 81/06* (2013.01); *B29C 64/307* (2017.08); *B29K 2079/085* (2013.01); *B29K 2081/06* (2013.01); *B33Y 10/00* (2014.12); *B33Y 70/00* (2014.12); *G03G 15/225* (2013.01)

(58) Field of Classification Search
None
See application file for complete search history.

(56) References Cited

U.S. PATENT DOCUMENTS

| | | |
|---|---|---|
| 3,421,528 A | 1/1969 | Gomez et al. |
| 3,509,013 A | 4/1970 | Oppenlander |

(Continued)

FOREIGN PATENT DOCUMENTS

| | | |
|---|---|---|
| DE | 102009047237 A1 | 8/2011 |
| EP | 0211604 A2 | 2/1987 |

(Continued)

OTHER PUBLICATIONS

Linares, A., and J. L. Acosta. "Structural Characterization of Polymer Blends Based on Polysulfones." Journal of Applied Polymer Science 92.(2004): 3030-3039. British Library Document Supply Centre Inside Serials & Conference Proceedings. Web. Feb. 16, 2017.*

(Continued)

*Primary Examiner* — Matthew J Daniels
*Assistant Examiner* — Manley L Cummins, IV
(74) *Attorney, Agent, or Firm* — Peter J. Ims; Westman, Champlin & Koehler, P.A.

(57) ABSTRACT

A support material for use in an additive manufacturing system to print a support structure for a three-dimensional part. The support material includes a base resin that is substantially miscible with a part material used to print the three-dimensional part, and has a glass transition temperature within about 10° C. of a glass transition temperature of the part material. The support material also includes a dispersed resin that is substantially immiscible with the base resin, where the base resin and the dispersed resin are each thermally stable for use in the additive manufacturing system in coordination with the part material.

14 Claims, 12 Drawing Sheets

(51) Int. Cl.

| | | |
|---|---|---|
| *B29C 64/106* | (2017.01) | |
| *B33Y 10/00* | (2015.01) | |
| *B33Y 70/00* | (2015.01) | |
| *B29K 81/00* | (2006.01) | |
| *B29K 79/00* | (2006.01) | |
| *B29C 64/307* | (2017.01) | |
| *G03G 15/22* | (2006.01) | |

(56) References Cited

U.S. PATENT DOCUMENTS

| | | | |
|---|---|---|---|
| 3,974,843 | A | 8/1976 | Aubert |
| 4,247,508 | A | 1/1981 | Housholder |
| 4,397,986 | A | 8/1983 | Hornbaker |
| 4,551,369 | A | 11/1985 | Belz |
| 4,671,982 | A | 6/1987 | Belz |
| 4,804,723 | A * | 2/1989 | Harris ............. C08L 71/00 525/534 |
| 4,818,803 | A * | 4/1989 | Harris ............. C08L 81/06 525/390 |
| 4,863,538 | A | 9/1989 | Deckard |
| 4,870,148 | A | 9/1989 | Belz et al. |
| 4,886,856 | A | 12/1989 | Chen et al. |
| 4,938,816 | A | 7/1990 | Beaman et al. |
| 4,944,817 | A | 7/1990 | Bourell et al. |
| 5,017,753 | A | 5/1991 | Deckard |
| 5,053,090 | A | 10/1991 | Beaman |
| 5,076,869 | A | 12/1991 | Bourell et al. |
| 5,121,329 | A | 6/1992 | Crump |
| 5,132,143 | A | 7/1992 | Deckard |
| 5,155,324 | A | 10/1992 | Deckard et al. |
| 5,164,466 | A * | 11/1992 | El-Hibri ............. A61L 2/26 525/534 |
| 5,204,055 | A | 4/1993 | Sachs et al. |
| 5,296,062 | A | 3/1994 | Bourell et al. |
| 5,303,141 | A | 4/1994 | Batchelder et al. |
| 5,316,580 | A | 5/1994 | Deckard |
| 5,317,043 | A | 5/1994 | Gass |
| 5,322,078 | A | 6/1994 | Tuttle |
| 5,322,878 | A | 6/1994 | Deibig et al. |
| 5,336,755 | A | 8/1994 | Pape |
| 5,340,433 | A | 8/1994 | Crump |
| 5,342,919 | A | 8/1994 | Dickens et al. |
| 5,346,955 | A | 9/1994 | Sasse et al. |
| 5,378,751 | A | 1/1995 | Deibig et al. |
| 5,382,308 | A | 1/1995 | Bourell et al. |
| 5,402,351 | A | 3/1995 | Batchelder et al. |
| 5,474,719 | A | 12/1995 | Fan et al. |
| 5,527,877 | A | 6/1996 | Dickens, Jr. et al. |
| 5,503,785 | A | 8/1996 | Crump et al. |
| 5,593,531 | A | 1/1997 | Penn |
| 5,597,589 | A | 1/1997 | Deckard |
| 5,616,294 | A | 4/1997 | Deckard |
| 5,639,070 | A | 6/1997 | Deckard |
| 5,648,450 | A | 7/1997 | Dickens, Jr. et al. |
| 5,653,925 | A | 8/1997 | Batchelder |
| 5,695,707 | A | 12/1997 | Almquist |
| 5,764,521 | A | 6/1998 | Batchelder et al. |
| 5,863,855 | A | 1/1999 | Ruggieri et al. |
| 5,866,058 | A | 2/1999 | Batchelder et al. |
| 5,939,008 | A | 8/1999 | Comb et al. |
| 5,950,644 | A | 9/1999 | Brewer |
| 5,990,268 | A | 11/1999 | Dickens, Jr. et al. |
| 6,004,124 | A | 12/1999 | Swanson et al. |
| 6,022,207 | A | 2/2000 | Dahlin et al. |
| 6,067,480 | A | 5/2000 | Stuffle et al. |
| 6,070,107 | A | 5/2000 | Lombardi et al. |
| 6,129,872 | A | 10/2000 | Jang |
| 6,136,948 | A | 10/2000 | Dickens, Jr. et al. |
| 6,165,406 | A | 12/2000 | Jang et al. |
| 6,175,422 | B1 | 1/2001 | Penn et al. |
| 6,228,923 | B1 | 5/2001 | Lombardi et al. |
| 6,245,281 | B1 | 6/2001 | Scholten et al. |
| 6,398,495 | B1 | 6/2002 | Kazianus |
| 6,572,807 | B1 | 6/2003 | Fong |
| 6,645,412 | B2 | 11/2003 | Priedeman, Jr. |
| 6,722,872 | B1 | 4/2004 | Swanson et al. |
| 6,790,403 | B1 | 9/2004 | Priedeman, Jr. et al. |
| 6,814,907 | B1 | 11/2004 | Comb |
| 6,887,640 | B2 | 5/2005 | Zhang et al. |
| 6,907,307 | B2 | 6/2005 | Chen et al. |
| 6,923,634 | B2 | 8/2005 | Swanson et al. |
| 7,077,638 | B2 | 7/2006 | Leyden et al. |
| 7,122,246 | B2 | 10/2006 | Comb et al. |
| 7,127,309 | B2 | 10/2006 | Dunn et al. |
| 7,208,257 | B2 | 4/2007 | Cheng et al. |
| 7,236,166 | B2 | 6/2007 | Zinniel et al. |
| 7,255,821 | B2 | 8/2007 | Priedeman, Jr. et al. |
| 7,384,255 | B2 | 6/2008 | LaBossiere et al. |
| 7,604,470 | B2 | 10/2009 | LaBossiere et al. |
| 7,625,200 | B2 | 12/2009 | Leavitt |
| 7,648,609 | B2 | 1/2010 | Leder et al. |
| 7,754,807 | B2 | 7/2010 | Priedeman, Jr. et al. |
| 7,794,647 | B1 | 9/2010 | Deckard |
| 7,896,209 | B2 | 3/2011 | Batchelder et al. |
| 7,938,351 | B2 | 5/2011 | Taatjes et al. |
| 7,938,356 | B2 | 5/2011 | Taatjes et al. |
| 8,153,182 | B2 | 4/2012 | Comb et al. |
| 8,221,669 | B2 | 7/2012 | Batchelder et al. |
| 8,221,858 | B2 | 7/2012 | Mannella et al. |
| 8,236,227 | B2 | 8/2012 | Batchelder et al. |
| 8,246,888 | B2 | 8/2012 | Hopkins et al. |
| 8,419,996 | B2 | 4/2013 | Swanson et al. |
| 8,459,280 | B2 | 6/2013 | Swanson et al. |
| 8,647,102 | B2 | 2/2014 | Swanson et al. |
| 8,658,250 | B2 | 2/2014 | Batchelder et al. |
| 2003/0004600 | A1 | 1/2003 | Priedeman |
| 2003/0090752 | A1 | 5/2003 | Rosenberger et al. |
| 2004/0222561 | A1 | 11/2004 | Hopkins |
| 2005/0004282 | A1 | 1/2005 | Priedeman et al. |
| 2005/0103360 | A1 | 5/2005 | Tafoya |
| 2005/0129941 | A1 | 6/2005 | Comb et al. |
| 2005/0133155 | A1 | 6/2005 | Leder et al. |
| 2005/0173838 | A1 | 8/2005 | Priedeman et al. |
| 2007/0003656 | A1 | 1/2007 | LaBossiere et al. |
| 2007/0066738 | A1 | 3/2007 | Gallucci et al. |
| 2007/0066739 | A1 | 3/2007 | Odle et al. |
| 2007/0123092 | A1 | 5/2007 | Legrand |
| 2007/0149629 | A1 | 6/2007 | Donovan et al. |
| 2007/0228590 | A1 | 10/2007 | LaBossiere et al. |
| 2008/0213419 | A1 | 9/2008 | Skubic et al. |
| 2009/0035405 | A1 | 2/2009 | Leavitt |
| 2009/0173443 | A1 | 7/2009 | Kozlak et al. |
| 2009/0274540 | A1 | 11/2009 | Batchelder et al. |
| 2009/0283119 | A1 | 11/2009 | Moussa et al. |
| 2010/0096072 | A1 | 4/2010 | Hopkins et al. |
| 2010/0096485 | A1 | 4/2010 | Taatjes et al. |
| 2010/0096489 | A1 | 4/2010 | Taatjes et al. |
| 2010/0190005 | A1 | 7/2010 | Nair et al. |
| 2010/0283172 | A1 | 11/2010 | Swanson |
| 2011/0074065 | A1 | 3/2011 | Batchelder et al. |
| 2011/0186081 | A1 | 8/2011 | Dunn et al. |
| 2011/0233804 | A1 | 9/2011 | Batchelder et al. |
| 2012/0070523 | A1 | 3/2012 | Swanson et al. |
| 2012/0070619 | A1 | 3/2012 | Mikulak et al. |
| 2012/0164256 | A1 | 6/2012 | Swanson et al. |
| 2012/0231225 | A1 | 9/2012 | Mikulak et al. |
| 2013/0077996 | A1 | 3/2013 | Hanson et al. |
| 2013/0077997 | A1 | 3/2013 | Hanson et al. |
| 2013/0078073 | A1 | 3/2013 | Comb et al. |
| 2013/0161432 | A1 | 6/2013 | Mannella et al. |
| 2013/0161439 | A1 | 6/2013 | Beery et al. |
| 2013/0161442 | A1 | 6/2013 | Mannella et al. |
| 2013/0171434 | A1 | 7/2013 | Hirth et al. |
| 2013/0186549 | A1 | 7/2013 | Comb et al. |
| 2013/0186558 | A1 | 7/2013 | Comb et al. |
| 2013/0333798 | A1 | 12/2013 | Bosveld et al. |

FOREIGN PATENT DOCUMENTS

| | | |
|---|---|---|
| EP | 0928316 A1 | 7/1999 |
| EP | 2631274 A1 | 8/2013 |
| FR | 2854764 A1 | 11/2004 |
| GB | 816016 | 7/1959 |

(56) References Cited

FOREIGN PATENT DOCUMENTS

| | | |
|---|---|---|
| WO | 9749771 A1 | 12/1997 |
| WO | 0020215 | 4/2000 |
| WO | 2004018542 A2 | 3/2004 |
| WO | 2006022528 A1 | 3/2006 |
| WO | 2007035402 A2 | 3/2007 |
| WO | 2009009525 A1 | 1/2009 |
| WO | 2010018789 A1 | 2/2010 |
| WO | 2010088618 A1 | 5/2010 |
| WO | 2011084995 A2 | 7/2011 |
| WO | 2012034666 A1 | 3/2012 |

OTHER PUBLICATIONS

MatWb, Solvay Specialty Polymers Radel® R-5000 Polyphenylsulfone (PPSU), <http://www.matweb.com/search/datasheet.aspx?matguid=dab4f10996cd41599c9d8c7163a95c29&ckck=> (Retrieved Nov. 30, 2017) ("MatWeb").*

International Search Report and Written Opinion dated Jun. 3, 2012 from International Application No. PCT/US2011/051735.

www.SolvaySpecialtyPolymers.com, "Selection and Processing Guide", Virantage High-Temperature Tougheners Selection and Processing Guide, Technical Bulletin, available prior to Oct. 31, 2013, 8 pages.

http://www.plastemart.com/upload/Literature/Polymide.asp, "Polyamide plays an important role in automotive, electronic and packaging", Oct. 27, 2008, 3 pages.

"Kuredux Polyglycolic Acid (PGA)", Technical Guidebook, Apr. 2011, 12 pages.

International Search Report and Written Opinion dated Mar. 9, 2016 for corresponding International Application No. PCT/US2015/058723, filed Nov. 3, 2015.

Communication pursuant to Article 94(c) EPC for corresponding European Application No. 15795281.3, filed May 19, 2017.

* cited by examiner

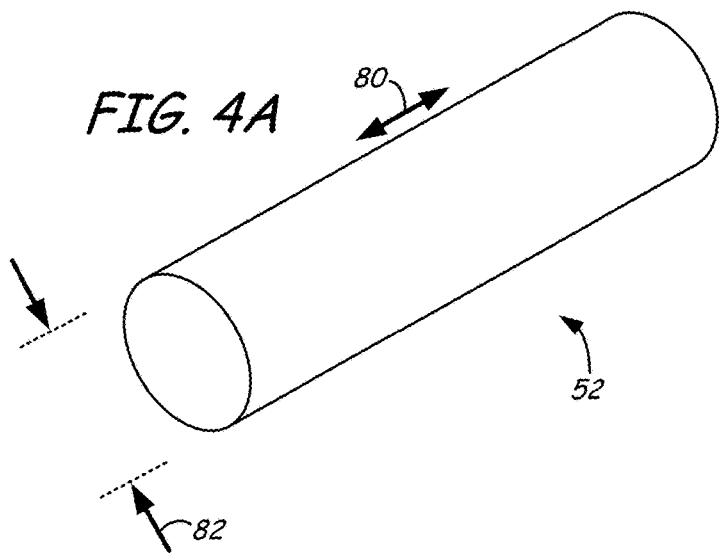
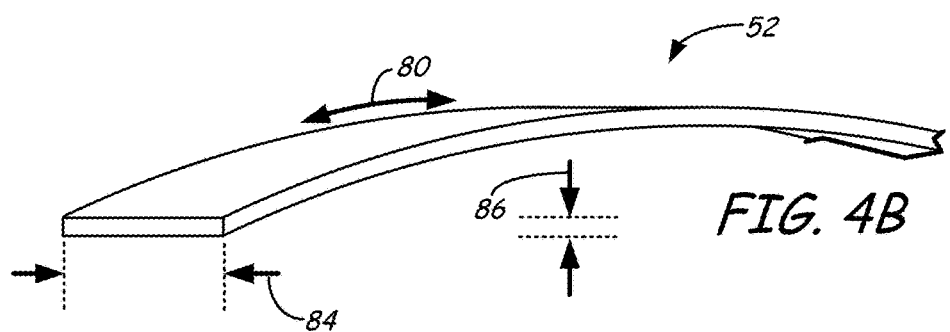
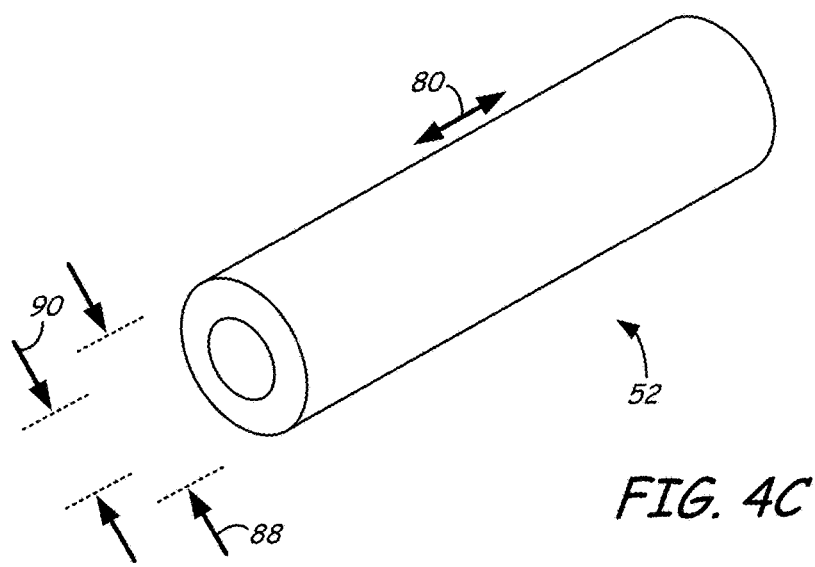

BREAK-AWAY SUPPORT MATERIAL FOR ADDITIVE MANUFACTURING

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, and methods of manufacturing and using the support materials and consumable assemblies in additive manufacturing systems to print 3D parts.

Additive manufacturing systems are used to print or otherwise build 3D parts from digital representations of the 3D parts (e.g., STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a support material for use in an additive manufacturing system to print a support structure for a 3D part printed from a part material. The support material includes a base resin having one or more first thermoplastic polymers, where the base resin is substantially miscible with the part material and has a similar glass transition temperature to the part material (e.g., within about 10° C.). The support material also includes a dispersed resin having one or more second thermoplastic polymers, where the dispersed resin is substantially immiscible with the base resin. The base resin and the dispersed resin each preferably have a thermal stability such that less than 10% by weight of either of the base resin or the dispersed resin thermally degrades when the support material is exposed to 350° C. for a 5-minute duration. The support material is also configured for use in the additive manufacturing system for printing the support structure from the support material in coordination with printing of the 3D part from the part material.

Another aspect of the present disclosure is directed to a support material for use in an additive manufacturing system to print a support structure for a 3D part printed from a part material, where the support material includes a first polyarylethersulfone (e.g., polyethersulfone) having a glass transition temperature ranging from about 205° C. to about 225° C., and that is substantially miscible with the part material, where the first polyarylethersulfone preferably constitutes from about 85% to about 95% by weight of the support material. The support material also includes a second polyarylethersulfone (e.g., polysulfone) that is substantially immiscible with first polyarylethersulfone and the part material. The support material is also configured for use in the additive manufacturing system for printing the support structure from the support material in coordination with printing of the 3D part from the part material.

Another aspect of the present disclosure is directed to a method for printing a 3D part with an additive manufacturing system. The method includes providing a part material and a support material, where the support material includes a base resin and a dispersed resin that is substantially immiscible with the base resin, and where at least one of the base resin and the dispersed resin is substantially miscible with the part material and has a similar glass transition temperature to the part material (e.g., within about 10° C.). The method also includes heating a chamber of the additive manufacturing system (e.g., to at least 185° C.), melting the support material with a melt processing temperature (e.g., greater than about 350° C.), forming layers of a support structure from the molten support material in the heated chamber, and forming layers of the 3D part from the part material in coordination with forming the support structure layers in the heated chamber. The method further includes removing the 3D part and the support structure from the chamber, where less than 10% by weight of the support material of the removed support structure is thermally degraded, and separating the removed support structure from the removed 3D part.

Definitions

Unless otherwise specified, the following terms as used herein have the meanings provided below:

The term "polymer" refers to a polymerized molecule having one or more monomer specifies, and includes homopolymers and copolymers. The term "copolymer" refers to a polymer having two or more monomer species, and includes terpolymers (i.e., copolymers having three monomer species).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyethersulfone is interpreted to include one or more polymer molecules of the polyethersulfone, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyethersulfone", "one or more polyethersulfones", and "polyethersulfone(s)" may be used interchangeably and have the same meaning.

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

The term "providing", such as for "providing a support material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 4A is a perspective view of a segment of a cylindrical filament of the support material.

FIG. 4B is a perspective view of a segment of a ribbon filament of the support material.

FIG. 4C is a perspective view of a segment of a hollow filament of the support material.

DETAILED DESCRIPTION

Figure 1:
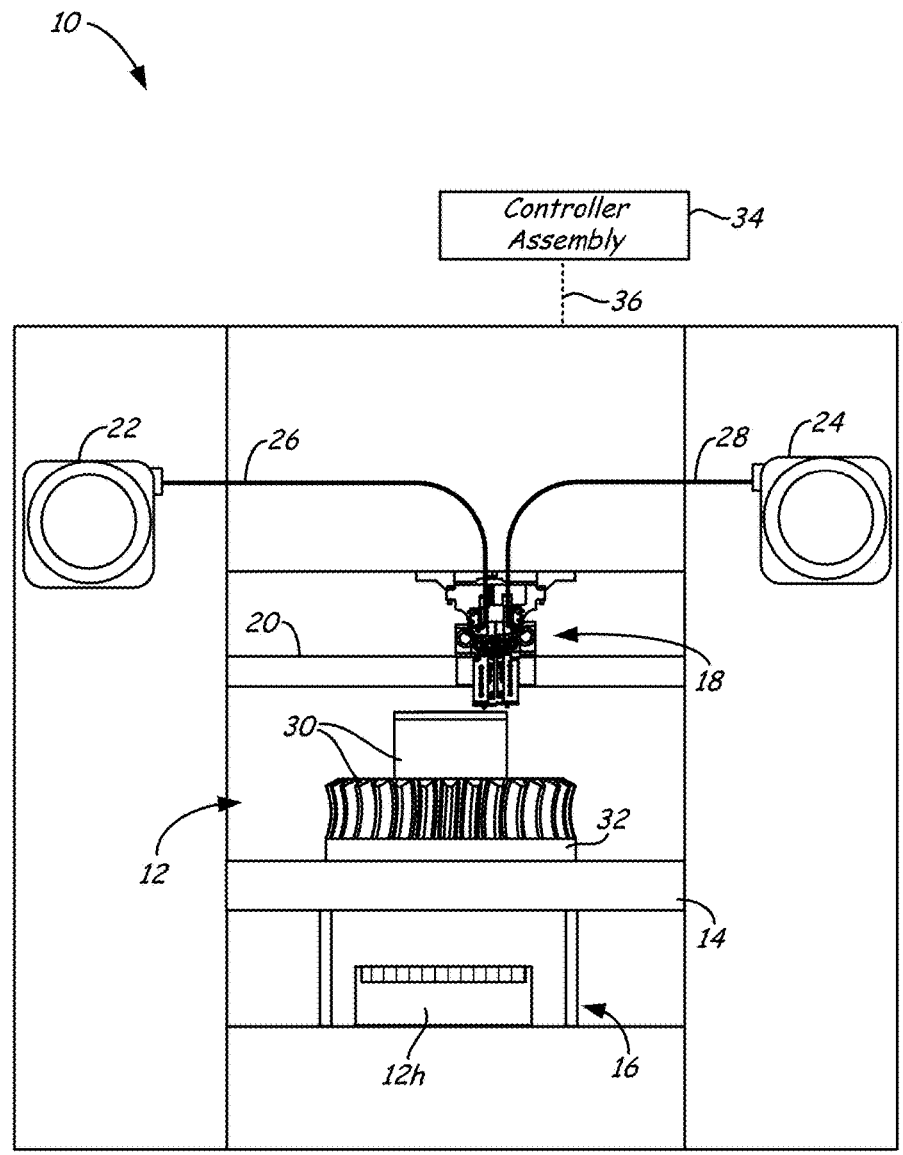
FIG. 1 is a front view of an extrusion-based additive manufacturing system configured to print 3D parts and support structures, where the support structures are printed from a support material of the present disclosure.

The present disclosure is directed to a support material, and more preferably a break-away support material, for printing support structures in additive manufacturing systems. The support material of the present disclosure functions as a sacrificial material for an associated part material (preferably a high-performance part material), and is desirable in cases where overhanging features are required in the final 3D part geometry, where significant angular slopes exist in the 3D part, and in some situations, to laterally encase the 3D part.

Once the 3D part has been printed, the support structure of the support material may be removed to reveal the completed 3D part, preferably without damaging any of the critical or delicate geometrical features of the 3D part. To accomplish this removal, the support structure may be physically broken apart from the 3D part under applied tensile loads (e.g., by hand). However, the layers of the support material also preferably exhibit good adhesion to the layers of the part material during the printing operation, which allows the support structure to function as an anchor to reduce distortions and curling of the 3D part. As can be appreciated, if the adhesion between the layers of the 3D part and support structure is too high, it can be very difficult to break the support structure apart from the 3D part without the risk of damaging features of the 3D part.

One current technique for achieving good adhesion and easy support removal involves chemically removing the support structure from the 3D part, such as with an alkaline aqueous solution. However, soluble support materials are typically not thermally stable at the high temperatures required for printing with high-performance part materials.

As such, the support material of the present disclosure incorporates a unique break-away removal system that exhibits good adhesion to part material layers, while also being easily removed from the 3D parts after the printing operations are completed. Briefly, the support material includes a multiple-phase polymeric blend with a base resin and a second resin dispersed in the base resin (referred to as a dispersed resin). The base resin and the dispersed resin are at least partially immiscible with each other, and more preferably, are substantially immiscible with each other. Furthermore, depending on their relative affinities to the part material, at least one of the base resin and the dispersed resin exhibits good adhesion to the part material, and has similar thermal properties to the part material.

It has been found that the immiscible blend of the base resin and the dispersed resin creates an "islands in the sea" effect, where discrete regions or "islands" of the dispersed resin reside the "sea" of the base resin. The discrete regions of the dispersed resin are believed to function as points of weakness in the otherwise good adhesion between the support material and the part material, which facilitate interfacial crack propagations within the support structure, and between the 3D part and the support structure. Accordingly, the support material can be printed as support structure layers that can anchor the layers of the part material against distortions and curling, while also allowing the resulting support structure to be broken away and removed from the 3D part without damaging features of the 3D part.

The support material of the present disclosure may be configured for use with several different additive manufacturing techniques, such as extrusion-based additive manufacturing systems, selective laser sintering systems, electrophotography-based additive manufacturing systems, and the like. As shown in FIG. 1, system 10 is an example extrusion-based additive manufacturing system for printing or otherwise building 3D parts and support structures using a layer-based, additive manufacturing technique, where the support structures may be printed from the support material of the present disclosure. Suitable extrusion-based additive manufacturing systems for system 10 include fused deposition modeling systems developed by Stratasys, Inc., Eden Prairie, Minn. under the trademark "FDM".

In the shown embodiment, system 10 includes chamber 12, platen 14, platen gantry 16, print head 18, head gantry 20, and consumable assemblies 22 and 24. Chamber 12 is an example build environment that contains platen 30 for printing 3D parts and support structures, where chamber 12 may be may be optionally omitted and/or replaced with different types of build environments. For example, a 3D part and support structure may be built in a build environment that is open to ambient conditions or may be enclosed with alternative structures (e.g., flexible curtains).

In the shown example, the interior volume of chamber 12 may be heated with heater 12$h$ to reduce the rate at which the part and support materials solidify after being extruded and deposited (e.g., to reduce distortions and curling). Heater 12$h$ may be any suitable device or assembly for heating the interior volume of chamber 12, such as by radiant heating and/or by circulating heated air or other gas (e.g., inert gases). In alternative embodiments, heater 12$h$ may be replaced with other conditioning devices, such as a cooling unit to generate and circulate cooling air or other gas. The particular thermal conditions for the build environment may vary depending on the particular consumable materials used.

Platen 14 is a platform on which 3D parts and support structures are printed in a layer-by-layer manner. In some embodiments, platen 14 may engage and support a build substrate, which may be a tray substrate as disclosed in Dunn et al., U.S. Pat. No. 7,127,309; may be fabricated from plastic, corrugated cardboard, or other suitable material; and may also include a flexible polymeric film or liner, painter's tape, polyimide tape, adhesive laminate (e.g., an applied glue), or other disposable fabrication for adhering deposited material onto the platen 14 or onto the build substrate. In some embodiments, platen 14 and/or the build substrate may be heated, such as with one or more electrically-resistive heating elements.

Platen gantry 16 is a robotic positioner (e.g., a gantry) configured to move platen 30 along (or substantially along) the vertical z-axis. Platen gantry 16 may operate with one or more motors (e.g., stepper motors and encoded DC motors), gears, pulleys, belts, screw drives, linear portals, robotic arms, delta configurations, hexapods, and the like.

In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of a part material, such as a high-performance part material, for printing 3D part 30 from the part material. Consumable assembly 24 may contain a supply of a support material of the present disclosure for printing support structure 32 from the given support material.

Head gantry 20 is a robotic mechanism configured to move print head 18 in (or substantially in) a horizontal x-y plane above platen 14. Examples of suitable gantry assemblies for head gantry 20 include those disclosed in Swanson et al., U.S. Pat. No. 6,722,872; and Comb et al., U.S. Publication No. 2013/0078073, where head gantry 36 may also support deformable baffles (not shown) that define a ceiling for chamber 12. While illustrated as a bridge-type gantry, head gantry 20 may utilize any suitable robotic mechanism for moving the retained print head 18, such as with one or more motors (e.g., stepper motors and encoded DC motors), gears, pulleys, belts, screws, robotic arms, and the like.

In an alternative embodiment, platen 14 may be configured to move in the horizontal x-y plane within chamber 12, and head gantry 20 may be configured to move print head 18 along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller assembly 34, which is one or more computer-based systems configured to operate the components of system 10. Controller assembly 34 may communicate over communication line 36 with the various components of system 10, such as chamber 12 (e.g., heater 12$h$), platen 14, platen gantry 16, print head 18, head gantry 20, consumable assemblies 22 and 24, and various sensors, calibration devices, display devices, and/or user input devices. Furthermore, while illustrated outside of system 10, controller assembly 34 and communication line 36 may be internal components to system 10.

Figure 2:
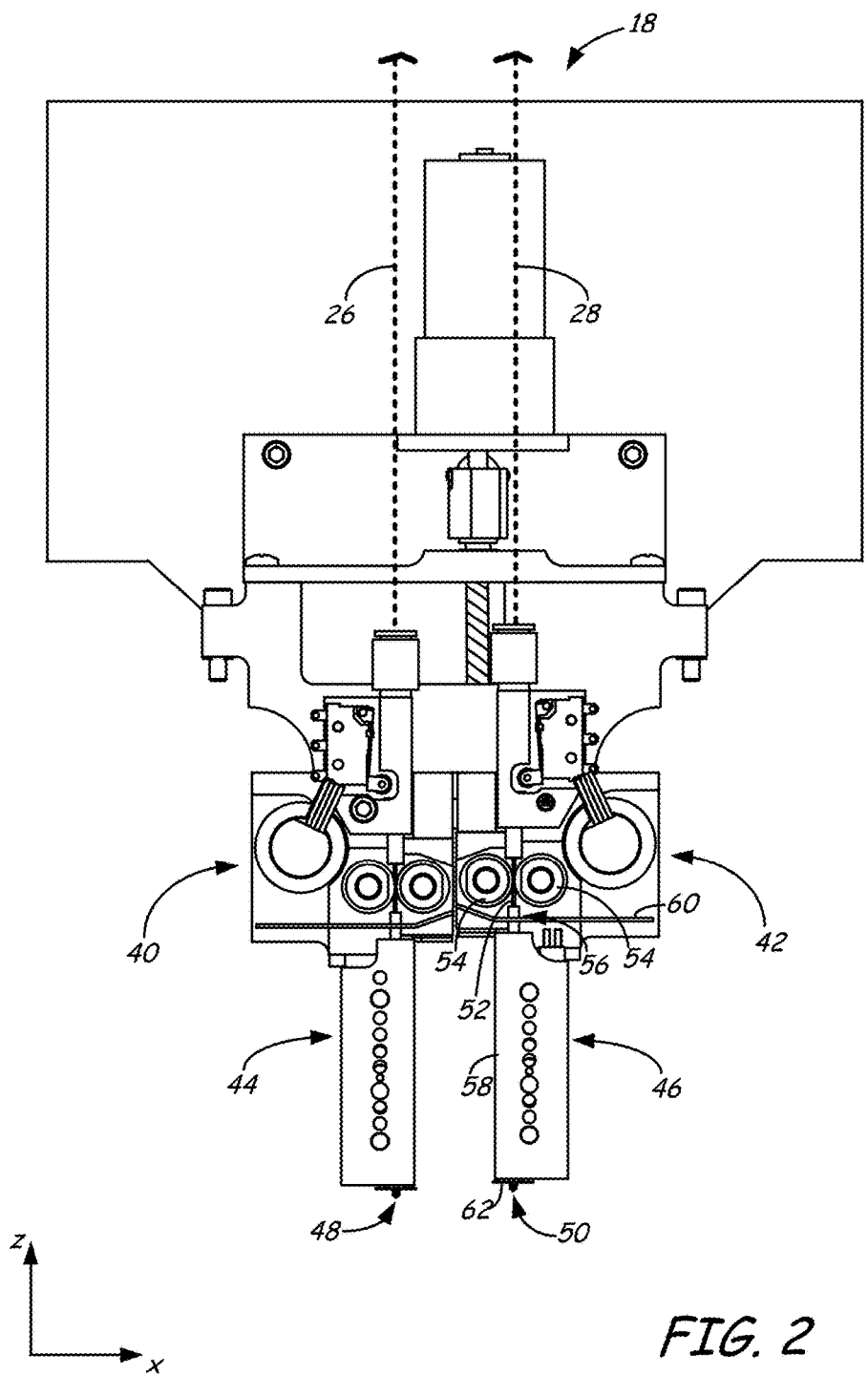
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. Nos. 8,419,996 and 8,647,102.

Figure 3:
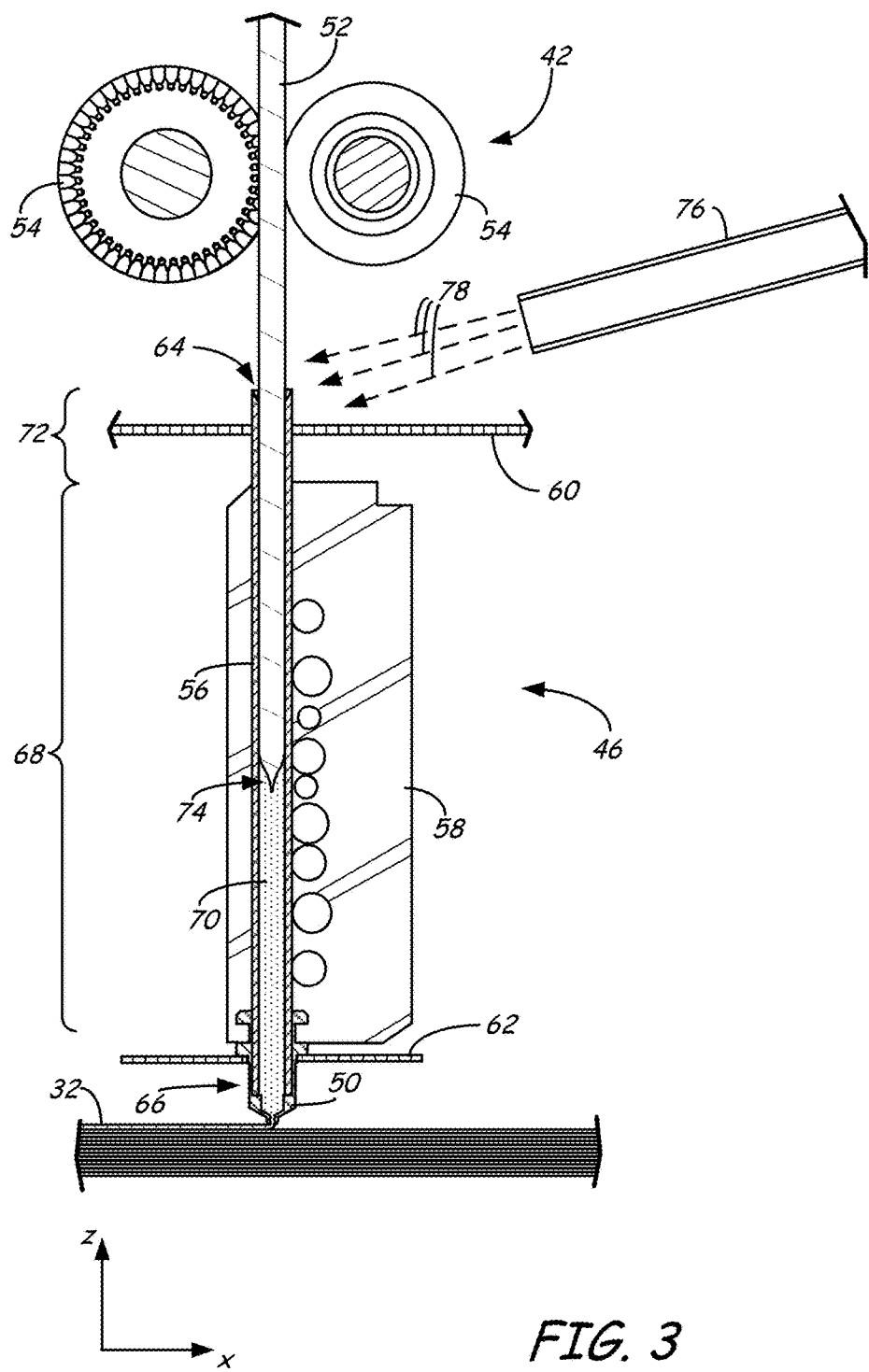
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52.

During operation, controller 34 may direct wheels 54 of drive mechanism 42 to selectively draw successive segments filament 52 (of the support material) from consumable assembly 24 (via guide tube 28), and feed filament 52 to liquefier assembly 46. Liquefier assembly 46 may include liquefier tube 56, thermal block 58, heat shield 60, and tip shield 62, where liquefier tube 56 includes inlet end 64 for receiving the fed filament 52. Nozzle 50 and tip shield 62 are accordingly secured to outlet end 66 of liquefier tube 56, and liquefier tube 56 extends through thermal block 58 and heat shield 60.

While liquefier assembly 46 is in its active state, thermal block 58 heats liquefier tube 56 to define heating zone 68. The heating of liquefier tube 56 at heating zone 68 melts the support material of filament 52 in liquefier tube 56 to form melt 70. Preferred liquefier temperatures for the support material range may vary depending on the particular polymeric blend used in the support material, and are preferably above the melt processing temperature of the support material. Examples of suitable temperatures for melting filament 52 in print head 18 include temperatures ranging from about 350° C. to about 450° C., from about 375° C. to about 425° C., and/or from about 390° C. to about 410° C.

The upper region of liquefier tube 56 above heating zone 68, referred to as transition zone 72, is preferably not directly heated by thermal block 58. This generates a thermal gradient or profile along the longitudinal length of liquefier tube 56.

The molten portion of the support material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads to print support structure 32 in a layer-by-layer manner in coordination with the printing of 3D part 30. While thermal block 58 heats liquefier tube 56 at heating zone 68, cooling air may also be blown through an optional manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is served to its active state for extruding the support material to print a layer of support structure 32, liquefier assembly 44 is switched to a stand-by state to prevent the part material from being extruded while liquefier assembly 46 is being used. After a given layer of the support material is completed, controller 34 then serves liquefier assembly 46 to its stand-by state, and switches liquefier assembly 44 to its active state for extruding the part material to print a layer of 3D part 30. This servo process may be repeated for each printed layer until 3D part 30 and support structure 32 are completed.

While liquefier assembly 44 is in its active state for printing 3D part 30 from a part material filament, drive mechanism 40, liquefier assembly 44, and nozzle 48 (each shown in FIG. 2) may operate in the same manner as drive mechanism 42, liquefier assembly 46, and nozzle 50 for extruding the part material. In particular, drive mechanism 40 may draw successive segments of the part material filament from consumable assembly 22 (via guide tube 26), and feed the part material filament to liquefier assembly 44. Liquefier assembly 44 thermally melts the successive segments of the received part material filament such that it becomes a molten part material. The molten part material may then be extruded and deposited from nozzle 48 as a series of roads onto platen 14 for printing 3D part 30 in a layer-by-layer manner in coordination with the printing of support structure 32.

After the print operation is complete, the resulting 3D part 30 and support structure 32 may be removed from chamber 12. Support structure 32 may then be sacrificially removed from 3D part 30, such as by breaking support structure 32 away from 3D part 30 under applied tensile loads (e.g., by hand). In some embodiments, the printed 3D part 30 and support structure 32 may be heated, or remain in a heated state after removal from chamber 12, to assist in the removal.

In further embodiments, the removed support structure may be collected and recycled or otherwise discarded in an environmentally-friendly manner. For example, the support material may optionally be collected and reprocessed into filament 52 (or any other suitable media form) for use in subsequent printing operations.

As mentioned above, the support material of the present disclosure (e.g., of filament 52) includes a polymeric blend of a base resin and a dispersed resin, and is preferably engineered for use with a high-performance, thermoplastic part material, such as a polyaryletherketone, polyarylethersulfone, polyetherimide, polyimide, and/or mixtures thereof. The base resin constitutes the majority of the polymeric blend in the support material (i.e., greater than 50% by weight), and functions as the "sea" for the polymeric blend. In comparison, the dispersed resin is dispersed throughout the base resin to function as the discrete regions or "islands" for the polymeric blend.

In preferred embodiments, the base resin and the dispersed resin of the support material are substantially immiscible with each other. As used herein, blends of immiscible resins exhibit separate glass transition temperatures that are substantially unchanged from those of the individual resins, as measured by Differential Scanning Calorimetry (DSC). These blends are typically turbid or opaque, which is an indication of phase separation. In comparison, blends of miscible resins substantially exhibit a single glass transition temperature, as measured by DSC. These blends are typically clear and transparent with a non-turbid, haze free appearance in thin sections or film (assuming no other additives are included).

Blends of partially miscible resins are in-between miscible resins and immiscible resins, and in some embodiments include blends where greater than about 50%, greater than about 75%, and/or greater than about 85% by weight of the dispersed resin is tolerable in the base resin and exhibits a noticeable shift in its glass transition temperature. Correspondingly, blends of partially immiscible resins are also in-between partially miscible resins and immiscible resins, and in some embodiments include blends where less than about 50%, less than about 25%, and/or less than about 15% by weight of the dispersed resin is tolerable in the base resin and exhibits a noticeable shift in its glass transition temperature. These miscibilities may be measured based on changes in the glass transition temperatures for the base resin and the dispersed resin from those of the individual resins.

Furthermore, at least one of the base resin and the dispersed resin have good adhesion to the part material. The adhesion between the part material and the base resin and/or dispersed resin preferably meets a minimum adhesion level, thereby allowing the support material layers to anchor the part material layers during a printing operation.

For example, in a first embodiment, the base resin is at least partially miscible with the part material, and more preferably, substantially miscible with the part material. This allows the base resin itself to exhibit an adhesion to the part material that exceeds the minimum adhesion level. In this embodiment, the dispersed resin may be substantially immiscible, partially immiscible, partially miscible, or substantially miscible with the part material. An example polymeric blend under this embodiment, for use with a polyetherimide (PEI) part material, includes a polyethersulfone (PES) base resin and a polysulfone (PSU) dispersed resin. The PES base resin is substantially miscible with the PEI part material, and the PSU dispersed resin is substantially immiscible with the PEI part material and the PES base resin.

In a second embodiment, the base resin is substantially immiscible with the part material. In this embodiment, the dispersed resin may be at least partially miscible with the part material, and more preferably, is substantially miscible with the part material. This allows the dispersed resin to exhibit good adhesion to the part material. An example polymeric blend under this embodiment, for use with a PEI part material, includes a polysulfone (PSU) base resin and a polyetherimide (PEI) dispersed resin. In this case, the PSU base resin is substantially immiscible with the PEI part material and the PEI dispersed resin, and the PEI dispersed resin is highly miscible with the PEI part material (and exhibits very good adhesion to the part material).

As mentioned above, the base resin preferably constitutes more than about 50% by weight of the polymeric blend. More preferably, the base resin constitutes from about 55% to about 99% by weight of the polymeric blend, and even more preferably from about 60% to about 95% by weight. In some embodiments, the base resin constitutes from about 85% to about 95% by weight of the polymeric blend. Examples of polymeric blends for these embodiments include a PES base resin and a PSU dispersed resin. In other embodiments, the base resin constitutes from about 60% to about 70% by weight of the polymeric blend. Examples of polymeric blends for these embodiments include a PSU base resin and a PEI dispersed resin.

Preferably, one or both of the base resin and the dispersed resin have similar thermal properties to the part material, such as similar glass transition temperatures. This allows the part and support materials to have similar heat deflection temperatures and other thermal characteristics when printed together as a material pair. For example, similar glass transition and heat deflection temperatures allow the part and support materials to be printed together in the same heated environment (e.g., chamber 12) to further prevent excessive distortions and curling.

Accordingly, in some embodiments, the base resin and/or the dispersed resin have a glass transition temperature that is within about 10° C. (above or below) of the glass transition temperature of the intended high-performance part material, and more preferably within about 5° C. In some preferred embodiments, the glass transition temperature of the base resin and/or the dispersed resin is substantially the same as that of the high-performance part material.

In preferred embodiments, the base resin and/or the dispersed resin may have glass transition temperatures greater than about 160° C., greater than about 180° C., and/or greater than about 200° C. In some embodiments, the base resin and/or the dispersed resin may have glass transition temperatures ranging from about 200° C. to about 230° C., and in some cases, from about 215° C. to about 225° C. This is in addition to being the same as or similar to the glass transition temperature of an associated part material (e.g., within 10° C., within 5° C., and the like), as discussed above. For example, when being paired with a polyetherimide part material having a glass transition temperature of about 215° C., the base resin and/or the dispersed resin may have a glass transition temperature ranging from about 205° C. to about 225° C., more preferably from about 210° C. to about 220° C., and even more preferably at about 215° C.

In some embodiments, the base resin has the same or similar glass transition temperature as the part material, and the dispersed resin has a lower glass transition temperature. These embodiments may apply to base resins that are substantially miscible with the part materials, and where the dispersed resins are substantially immiscible with the part materials. For example, a PES base resin may have a similar glass transition temperature as a PEI part material (e.g., within 10° C., within 5° C., and the like), and a PSU dispersed resin may have a lower glass transition temperature. For instance, the PSU dispersed resin may have a glass transition temperature of about 10° C. to about 40° C. lower than that of the PEI part material and/or the PES base resin (e.g., ranging from about 180° C. to about 190° C.).

In other embodiments, the dispersed resin has the same or similar glass transition temperature as the part material, and the base resin has a lower glass transition temperature. These embodiments may apply to dispersed resins that are substantially miscible with the part materials, and where the base resins are substantially immiscible with the part materials. For example, a PEI dispersed resin may have a similar glass transition temperature as a PEI part material (e.g., within 10° C., within 5° C., and the like), and a PSU base resin may have a lower glass transition temperature. For instance, the PSU base resin may have a glass transition temperature of about 10° C. to about 40° C. lower than that of the PEI part material and/or the PEI dispersed resin (e.g., ranging from about 180° C. to about 190° C.).

As mentioned above, in some embodiments, chamber 12 may be heated to one or more elevated temperatures. Preferably, the temperature within chamber 12 is set such that a temperature at the build plane below print head 18 is held within about 30° C. below the glass transition temperature of the part material, more preferably within about 25° C. below the glass transition temperature, and even more preferably within about 20° C. below the glass transition temperature. Examples of suitable set point temperatures for chamber 12 include those greater than about 150° C., from about 175° C. to about 225° C., and/or from about 190° C. to about 210° C.

High glass transition temperatures, however, typically correspond to higher melt processing temperatures (e.g., for filament production and extrusion from print head 18) for the support material. In fact, these melt processing temperatures can exceed 350° C. or even 400° C. for use with some high-performance part materials, such as polyphenylsulfones, polyethersulfones, polyetherimides, polyimides, and the like.

The high melt processing temperatures can accordingly raise thermal stability issues, which relates to the thermal-degradation kinetics threshold (TDKT) of a polymeric material. The TDKT is a time-temperature parameter that defines a rate of thermal degradation of a polymeric material, such as by depolymerization, backbone chain scission, pendant-group stripping, polymer cross linking, and/or oxidation processes. The thermal degradation of a support material can reduce the desired physical properties of the material, such as changing the glass transition temperature, dissolution characteristics, physical appearance, adhesive properties, and the like. These effects can prevent the degraded support material from functioning as a sacrificial support structure 32.

The TDKT reaction rate typically follows the first-order Arrhenius equation, which is substantially linear with time and exponential with temperature. As an example, for a support material exposed to a given heating temperature for a given duration, increasing the exposure temperature by a small amount (e.g., about 10° C.) and reducing the exposure duration by about 50% (e.g., doubling the flow rate) may net about the same thermal reaction rates on the support material, although the particular net thermal effects may vary depending on the support material composition.

In a fused deposition modeling process, the duration component of the TDKT for a support material is typically the time required to melt and extrude the support material from a print head. This can range from about 3-10 seconds, but can be longer in some cases, such as even 90-120 seconds. As such, the base resin and the dispersed resin are each preferably capable of being melted and extruded from print head 18 (with the above-discussed example operating temperatures) in a layer-by-layer manner in coordination with a high-performance part material with no appreciable thermal degradation. This is in addition to any melt processing required for filament production, which can also expose the support material to elevated temperatures for 60-120 seconds, for example.

Accordingly, when used in system 10, the support material is preferably thermally stable enough to be melted in liquefier tube 56 and extruded from nozzle 50 without appreciable thermal degradation, which can expose the support material to a melt processing temperature for durations of 3-10 seconds, or longer in some cases (e.g., 5 seconds, 10 seconds, 30 seconds, 1 minute, 5 minutes, 10 minutes, 30 minutes, and the like). Additionally, the support material is also preferably thermally stable to withstand elevated temperatures in chamber 12 for extended durations, such as up to 96 hours or more, without appreciable thermal degradation.

Accordingly, the support material is preferably printable with an additive manufacturing system (e.g., system 10) such that less than 10% by weight of either of the base resin or the dispersed resin thermally degrades during the printing operation. More preferably, less than 5% by weight, even more preferably less than 1% by weight, and even more preferably less than 0.5% by weight of either of the base resin or the dispersed resin thermally degrades during the printing operation.

Suitable test standards for the thermal stability of each of the base resin and the dispersed resin include those discussed under the Thermal Stability standard in the Property Analysis And Characterization Procedures section below. For example, each of the base resin and the dispersed resin are preferably thermally stable when exposed to 350° C., 375° C., and/or 400° C. for a 10-second duration, a 1-minute duration, a 3-minute duration, and/or a 5-minute duration (e.g., for melt processing), and/or exposure to 185° C. and/or 200° C. for a 25-hour duration, a 50-hour duration, and/or a 75-hour duration (e.g., for annealing in chamber 12).

In some preferred embodiments, the support material is substantially free of polymers that are not thermally stable under one or more of these test standards. As mentioned above, this can otherwise reduce the desired physical properties of the support material, which can prevent the degraded support material from functioning as a sacrificial support structure 32.

Examples of suitable polymers for the base resin in the polymeric blend include one or more polyarylethersulfones, where mixtures of multiple polyarylethersulfones for the base resin are preferably substantially miscible with each other. Examples of preferred polyarylethersulfones for the base resin include polyethersulfones, polyphenylsulfones, polysulfones, and substantially miscible mixtures thereof. In some further embodiments, the base resin consists essentially of one or more polyethersulfones, such as a polyethersulfone having chain units illustrated below in Formula 1:

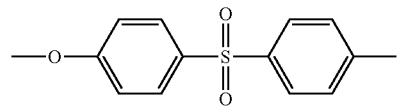

(Formula 1)

As shown in Formula 1, the backbone chain of the polymer may have an ester linkage and a pair of aromatic groups on opposing sides of a sulfonyl group. The molecular weights for the polyethersulfone(s) in the base resin may be characterized by their melt volume-flow rate and/or their melt flow indices. Examples of suitable melt volume flow rate range from about 30 cubic-centimeters/10 minutes (cm³/10 min) to about 165 cm³/10 min, and more preferably from about 50 cm³/10 min to about 90 cm³/10 min, where the melt volume-flow rate is measured pursuant to ISO 1133:2011 at 360° C. and a 10-kilogram load. Examples of suitable melt flow indices range from about 10 grams/10 minutes (g/10 min) to about 85 g/10 min, and more preferably from about 20 g/10 min to about 40 g/10 min, where the melt flow index is measured pursuant to ASTM D1238-13 at 380° C. and a 2.16-kilogram load. The use of a PES base resin is particularly useful with a PEI part material, and in preferred embodiments, with a PSU dispersed resin.

In alternative embodiments, the base resin consists essentially of polysulfone. The molecular weights for the polysulfone in the base resin may also be characterized by their melt volume-flow rate and/or their melt flow indices. Examples of suitable melt flow indices range from about 5 g/10 min to about 25 g/10 min, and more preferably from about 15 g/10 min to about 20 g/10 min. In these embodiments, the dispersed resin preferably is substantially miscible with the part material, such as a PEI dispersed resin and/or a PES dispersed resin.

The dispersed resin of the polymeric blend may include any suitable polymer that is substantially immiscible with the base resin. Examples of suitable polymers for the dispersed resin include one or more polyarylethersulfones, polyetherimides, blends of polyphenyleneoxides and polystyrenes, and substantially miscible mixtures thereof. Examples of preferred polyarylethersulfones for the dispersed resin include one or more polysulfones. In some further embodiments, the dispersed resin consists essentially of the one or more polysulfones.

Examples of suitable melt flow indices for the polysulfone(s) in the dispersed resin range from about 5 g/10 min to about 25 g/10 min, and more preferably from about 15 g/10 min to about 20 g/10 min. The use of a PSU dispersed resin is particularly useful with a PEI part material and a PES base resin.

In alternative embodiments, the dispersed resin includes, and more preferably, consists essentially of, one or more polyetherimides. In these embodiments, examples of suitable weight-average molecular weights for the polyetherimide(s) range from about 30,000 grams/mole to about 60,000 grams/mole, and in some embodiments, from about 46,000 grams/mole to about 57,000 grams/mole. The use of a polyetherimide dispersed resin is particularly useful with a polyetherimide-based part material.

The base resin and the dispersed resin may also be compounded with one or more additional additives, if desired, such as colorants, fillers, plasticizers, impact modifiers, polymer stabilizers (e.g., antioxidants, light stabilizers, ultraviolet absorbers, and antiozonants), biodegradable additives, and combinations thereof. In embodiments that include colorants, preferred concentrations of the colorants in the support material range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the support material range from about 1% to about 25% by weight. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In the embodiments including the above-discussed additional additives, the polymeric blend of the base resin and the dispersed resin preferably constitutes the remainder of the support material. As such, the polymeric blend may constitute from about 55% to 100% by weight of the support material, and more preferably from about 75% to 100% by weight. In some embodiments, the polymeric blend constitutes from about 90% to 100% by weight of the support material, more preferably from about 95% to 100% by weight. In further embodiments, the support material consists essentially of the polymeric blend, and optionally, one or more antioxidants and/or colorants.

Figure 4D:
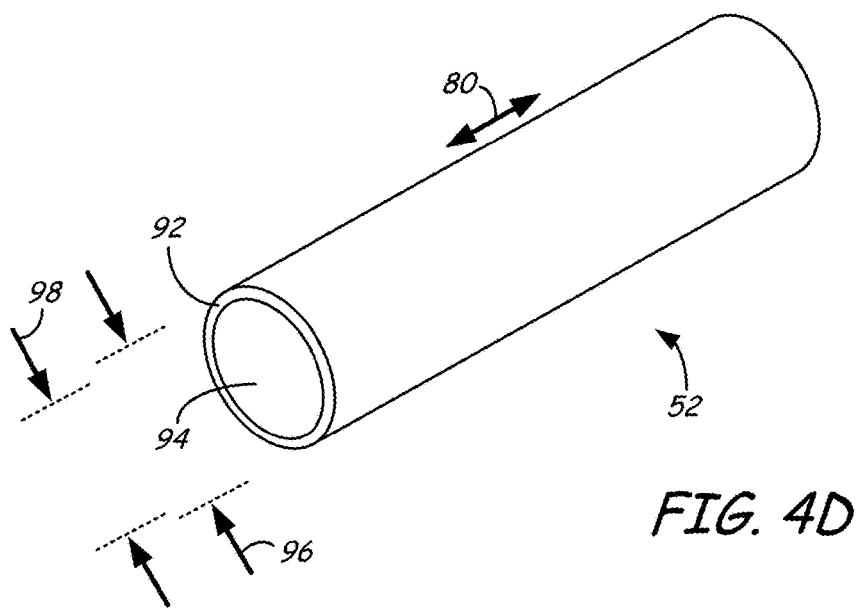
FIG. 4D is a perspective view of a segment of a cylindrical core-shell filament of the support material.

The resulting support material may then be formed into a desired media for use with an additive manufacturing system. For example, the support material may be melt processed and extruded to produce filament 52 for use in system 10. FIGS. 4A-4E illustrate example embodiments for filament 52 produced with the support material of the present disclosure. As shown in FIG. 4A, filament 52 may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. For example, filament 52 may have a longitudinal length 80 and an average diameter (referred to as diameter 82) along longitudinal length 80.

As used herein, the term "average diameter" of a filament (e.g., diameter 82) is an average based on a 100-foot segment length of the filament. Diameter 82 may be any suitable dimension that allows filament 52 to be received by a print head of an additive manufacturing system (e.g., print head 18). Suitable dimensions for diameter 82 range from about 1.0 millimeter (about 0.04 inches) to about 3.0 millimeters (about 0.12 inches). In some embodiments, diameter 82 preferably ranges from about 1.0 millimeter (about 0.04 inches) to about 1.5 millimeters (about 0.06 inches). In other embodiments, diameter 82 preferably ranges from about 1.5 millimeters (about 0.06 inches) to about 2.0 millimeters (about 0.08 inches). The above-discussed ranges for diameter 82 may alternatively be referred to based on the average cross-sectional area of filament 52.

Alternatively, as shown in FIG. 4B, filament 52 may have a non-cylindrical geometry, such as a ribbon filament as disclosed in Batchelder et al., U.S. Pat. No. 8,221,669. It is understood that "ribbon filament" may have a rectangular cross-sectional geometry with right-angle corners and/or with rounded corners, and/or an elongated oval cross-sectional geometry. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

As shown in FIG. 4B, filament 52 may have a longitudinal length 80, an average width (referred to as width 84), and an average thickness (referred to as thickness 86). As used herein, the terms "average width" and "average thickness" of a filament (e.g., width 84 and thickness 86) are each an average based on a 100-foot segment length of the filament. Width 84 and thickness 86 may be any suitable dimensions that allows ribbon filament 52 to be received by a print head of an additive manufacturing system (e.g., print head 18). Suitable dimensions for width 84 range from about 1.0 millimeter (about 0.04 inches) to about 10.2 millimeters (about 0.40 inches), and more preferably from about 2.5 millimeters (about 0.10 inches) to about 7.6 millimeters (about 0.30 inches). Suitable dimensions for thickness 86 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

The above-discussed ranges for width 84 and thickness 86 may alternatively be referred to based on the average cross-sectional area of filament 52. Furthermore, the cross-sectional dimensions of filament 52 for the ribbon-filament embodiment shown in FIG. 4B may also be referred to based on the cross-sectional aspect ratio of width 84 to thickness 86. For example, the cross-sectional aspect ratio (width 84-to-thickness 86) may range from about 2:1 to about 20:1. In some embodiments, the cross-sectional aspect ratio ranges from about 2.5:1 to about 10:1, and in further embodiments from about 3:1 to about 10:1.

Furthermore, as shown in FIG. 4C, filament 52 may alternatively have a hollow geometry. In this embodiment, filament 52 may have a longitudinal length 80, an average outer diameter (referred to as outer diameter 88) along longitudinal length 80, and an average inner diameter (referred to as inner diameter 90) along longitudinal length 80. As used herein, the terms "average outer diameter" and "average inner diameter" of a filament (e.g., outer diameter 88 and inner diameter 80) are each an average based on a 100-foot segment length of the filament.

Outer diameter 88 and inner diameter 90 may be any suitable dimensions that allows hollow filament 52 to be received by a print head of an additive manufacturing system (e.g., print head 18). Suitable dimensions for outer diameter 88 include those discussed above for diameter 82. Inner diameter 90 may range from about 0.003 inches to about 0.3 inches. In some embodiments, inner diameter 90 preferably ranges from about 0.005 inches to about 0.15 inches. In other embodiments, inner diameter 90 preferably ranges from about 0.01 inches to about 0.03 inches. The above-discussed ranges for outer diameter 88 and inner diameter 90 may each alternatively be referred to based on the average cross-sectional area of filament 52.

In some preferred embodiments, inner diameter 90 is greater than an inner diameter of nozzle 48 (or nozzle 50) of print head 18. This allows the backflow of melt 70 in liquefier tube 56 to pass through the inner annulus of filament 52, rather than flow around the exterior side of filament 52. In particular, the hydraulic resistance of the inner annulus of filament 52 is low compared to the cylindrical sheath between the wall of liquefier tube 56 and the outer surface of filament 52.

Additionally, filament 52 having the hollow geometry as shown in FIG. 4C preferably has a compliance with respect to wheels 54 of drive mechanism 40 that ranges from about two times to about ten times greater than a corresponding compliance of the solid filament 52, as shown in FIG. 4A. In other words, if the hollow filament 52 is too soft, wheels 54 may not be capable of driving filament 52 into liquefier assembly 44. However, a mild amount of compliance can be beneficial to reduce any adverse effects caused by variations in outer diameter 88. Moreover, diameter oscillations that can be inherent when manufacturing filaments can be accommodated by variations in inner diameter 90, preferably making it easier to manufacture hollow filament 52 with a near-constant outer diameter 88 compared to a solid filament 52 (e.g., as shown in FIG. 4A).

Furthermore, as also discussed in Batchelder et al., U.S. Pat. No. 8,221,669, hollow filament 52 may allow system 10 to operate with faster liquefier response times and/or feed rates, and liquefier assembly 44 may optionally include a mating core to hollow filament 52, so that the extrudate is heated from the inside as well as the outside.

Yet another advantage of a hollow filament 52 is the reduced thermal conduction at inlet end 64 of liquefier tube 56. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Figure 4E:
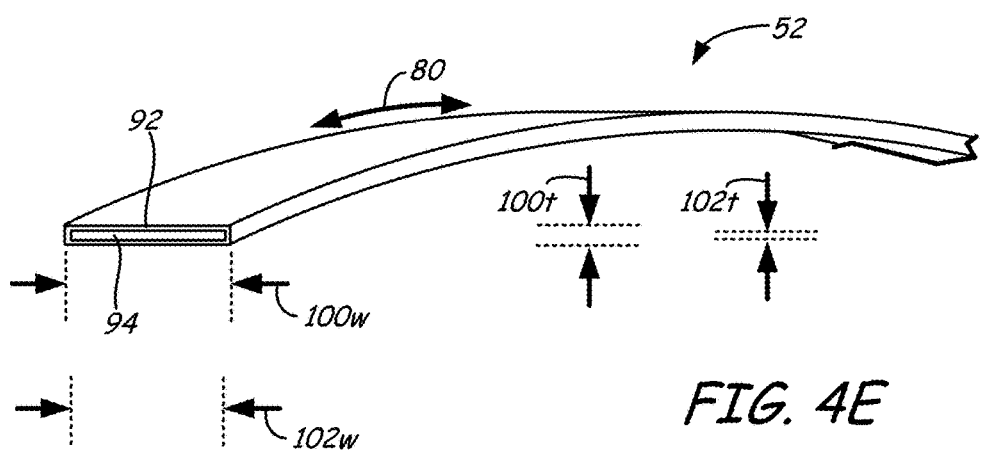
FIG. 4E is a perspective view of a segment of a ribbon core-shell filament of the support material.

Additionally, as shown in FIGS. 4D and 4E, filament 52 may alternatively have a core-shell geometry, as mentioned above, where the support material may be used to form either the core or the shell. For instance, the support material of this embodiment may function as a shell in combination with a bulk core of a second polymer material, such as a second support material.

In either the cylindrical embodiment shown in FIG. 4D or the ribbon embodiment shown in FIG. 4E, filament 52 may have a longitudinal length 80, a shell portion 92, and a core portion 94, where the shell portion 92 and core portion 94 each preferably extend along longitudinal length 80. In further alternative embodiments, filament 52 may three or more cross-sectional portions (e.g., a core portion and two or more shell portions).

In the cylindrical embodiment shown in FIG. 4D, shell portion 92 has an average outer diameter (referred to as outer diameter 96) along longitudinal length 80, and an average inner diameter (referred to as inner diameter 98) along longitudinal length 80, where inner diameter 98 corresponds to an outer diameter of core portion 94. It is understood that, in some embodiments, the interface between shell portion 92 and core portion 94 may be gradual, where the materials of shell portion 92 and core portion 94 may be blended together along a gradient. Examples of suitable core-shell geometries for this embodiment (e.g., outer diameter 96 and inner diameter 98) include those discussed in Mikulak et al., U.S. Publication Nos. 2012/0070619 and 2012/0231225.

Alternatively, in the ribbon embodiment shown in FIG. 4E, which is a combination of the embodiments shown above in FIGS. 4B and 4D, shell portion 92 may have an average outer width (referred to as outer width 100w) and an average inner width (referred to as inner width 102w) along longitudinal length 80, where inner width 102w corresponds to an outer width of core portion 94. Similarly, shell portion 92 may have an average outer thickness (referred to as outer thickness 100t) and an average inner thickness (referred to as inner thickness 102t) along longitudinal length 80, where inner thickness 102t corresponds to an outer thickness of core portion 94. Examples of suitable core-shell geometries for this embodiment (e.g., widths 100w and 102w, and thicknesses 100t and 102t) include those discussed in Mikulak et al., U.S. Publication Nos. 2012/0070619 and 2012/0231225, and those discussed above for the ribbon filament 52 in FIG. 4B.

Consumable assembly 24 may include any suitable length of filament 52 as illustrated in FIGS. 4A-4E. Thus, longitudinal length 80 for filament 52 in the embodiments shown in FIGS. 4A-4E is preferably about 100 feet or more. In additional embodiments, filament 52 (e.g., as shown in FIGS. 4A-4E) may include topographical surfaces patterns (e.g., tracks) as disclosed in Batchelder et al., U.S. Pat. No. 8,236,227; and/or may include encoded markings as disclosed in Batchelder et al., U.S. Pat. No. 8,658,250.

Figure 5A:
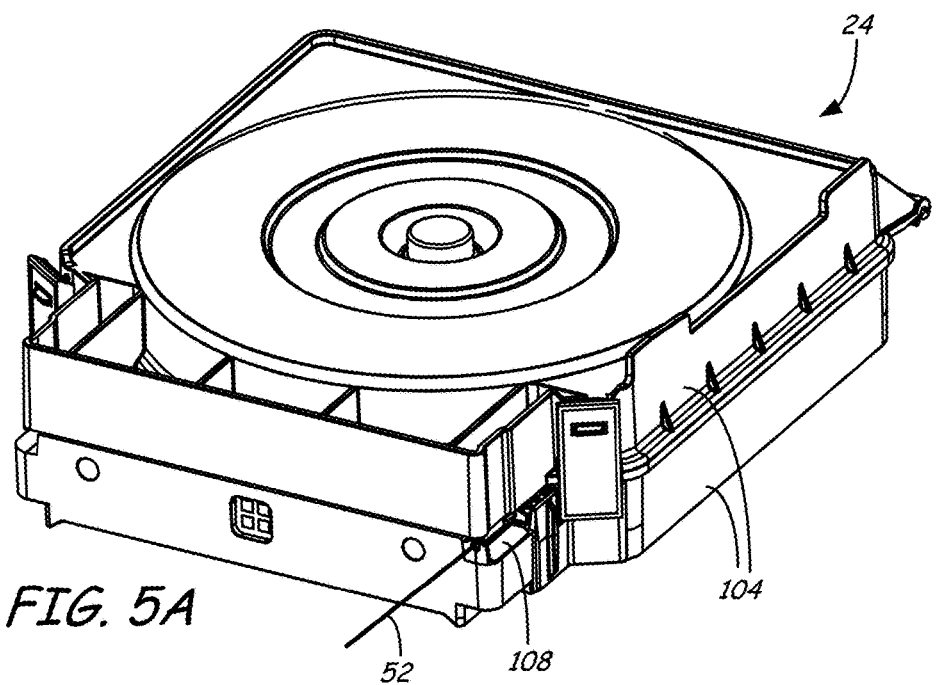
FIG. 5A is a perspective view of a first embodied consumable assembly for retaining a supply of the support material in filament form.
Figure 5B:
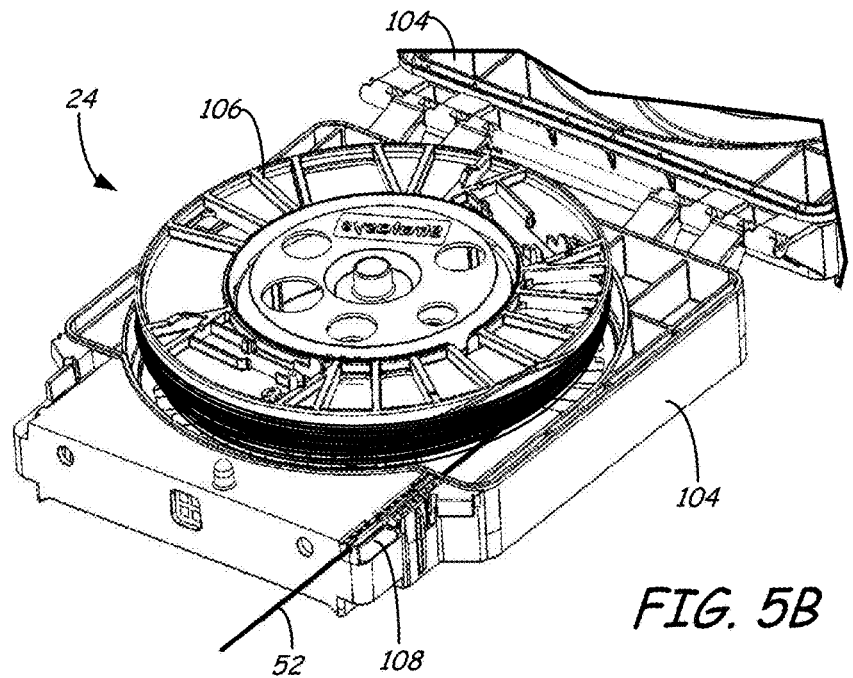
FIG. 5B is a perspective view of the first embodied consumable assembly in an open state, illustrating an interior of the first embodied consumable assembly.

FIGS. 5A-9 illustrate examples of suitable consumable assemblies for consumable assembly 24, which may retain a supply of filament 52 of the support material. For example, FIGS. 5A and 5B illustrates consumable assembly 24 with a container portion 104, spool 106, and guide mechanism 108, where container portion 104 is configured to open and close in a sealing manner as shown to retain spool 106 and guide mechanism 108. Spool 106 accordingly retains a supply of filament 52 of the support material, and relays filament 52 out of consumable assembly 24 via guide mechanism 108.

During use, container portion 104 may be loaded to or otherwise engaged with system 10, which aligns guide mechanism 108 with a reciprocating orifice of system 10 (not shown) to deliver filament 52 to guide tube 28. Examples of preferred devices for consumable assembly 24 in this embodiment include those disclosed in Taatjes et al, U.S. Pat. Nos. 7,938,351 and 7,938,356. Alternatively, consumable assembly 24 may have spool and cassette arrangements as disclosed in Swanson et al., U.S. Pat. No. 6,923,634 and Comb et al., U.S. Pat. No. 7,122,246.

Figure 6A:
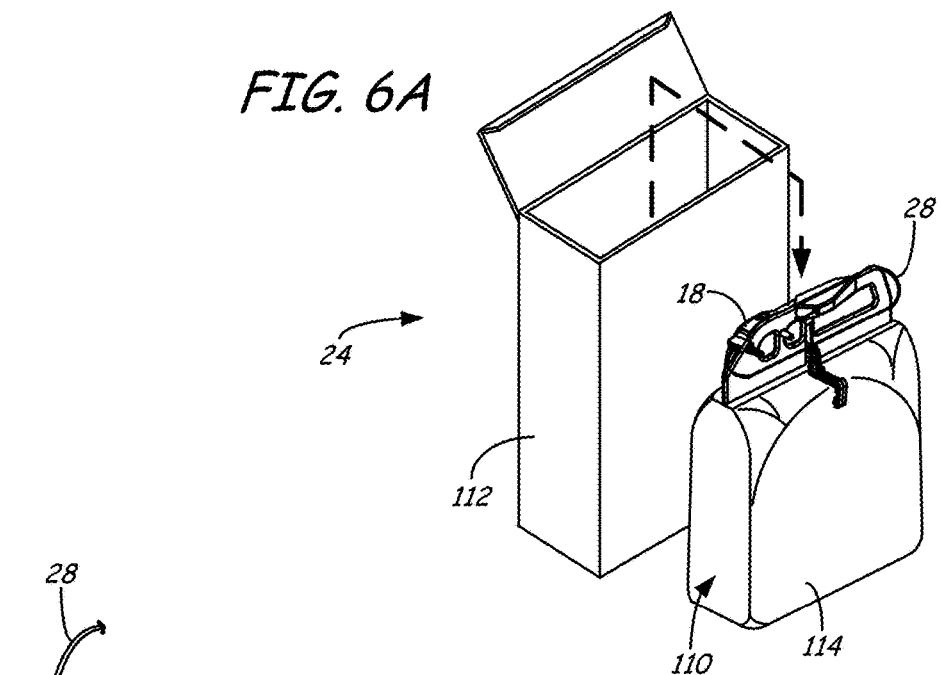
FIG. 6A is a perspective view of a second embodied consumable assembly for retaining a supply of the support material in filament form.
Figure 6B:
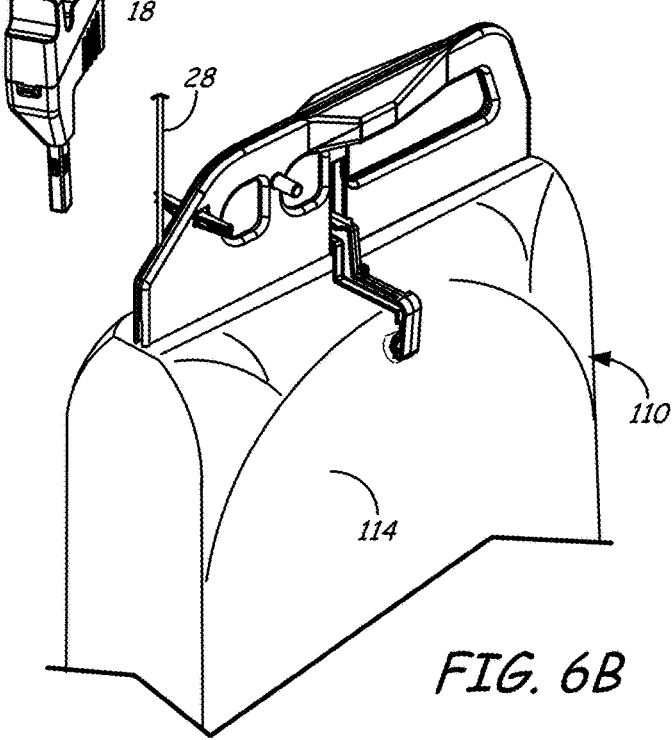
FIG. 6B is an expanded perspective view of the second embodied consumable assembly, illustrating an integrated print head and guide tube.
Figure 6C:
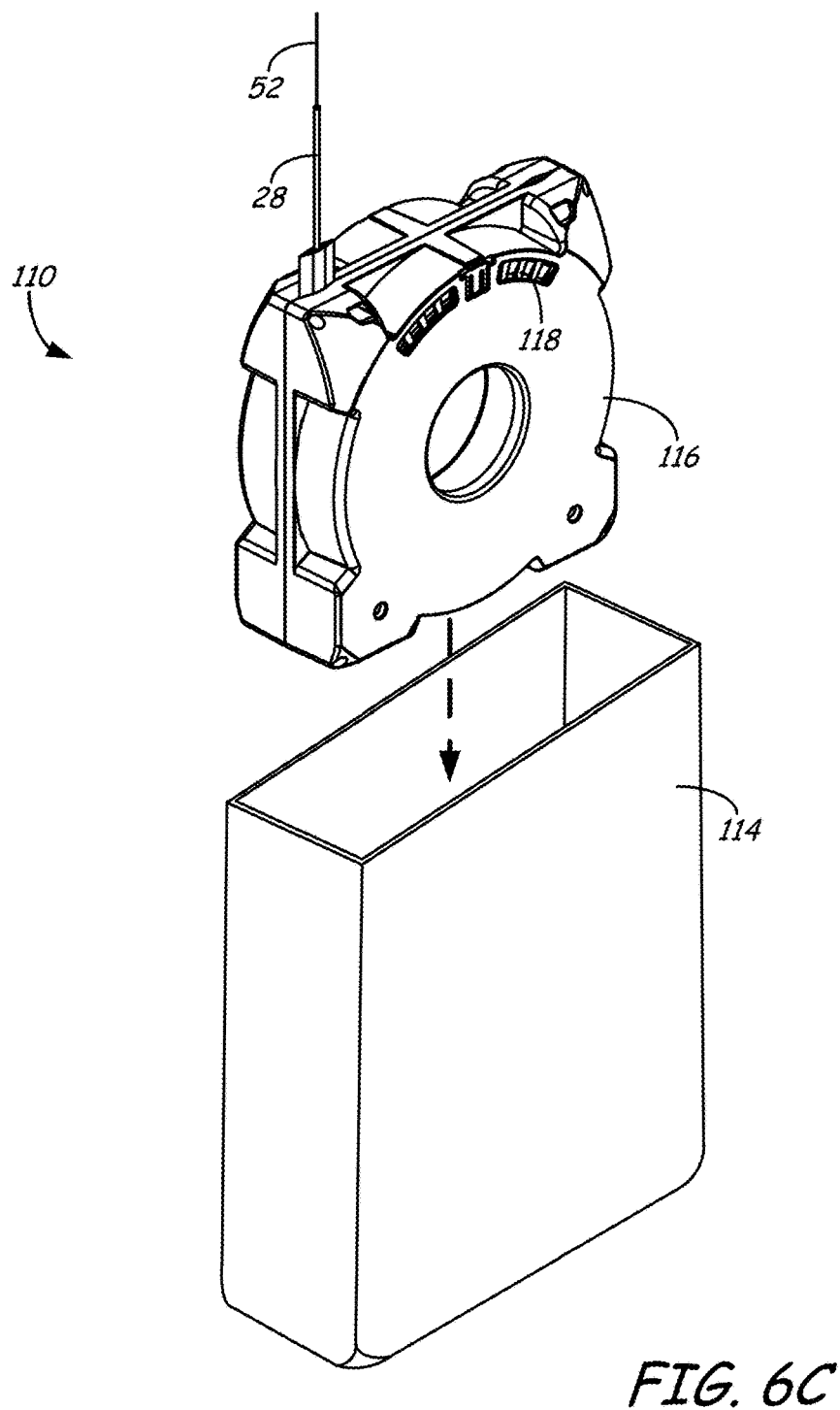
FIG. 6C is a perspective view of a container portion of the second embodied consumable assembly.

FIGS. 6A-6C illustrate an alternative embodiment for print head 18, consumable assembly 24, and guide tube 28, which are combined into a single, removable assembly, such as disclosed in Mannella et al., U.S. Publication Nos. 2013/0161439 and 2013/0161442. As shown in FIG. 6A, in this embodiment, consumable assembly 24 preferably includes container portion 110, which may be retained in a storage box 112, and is configured to mount print head 18 and guide tube 28.

As shown in FIG. 6B, print head 18 and guide tube 28 may be unmounted from container portion 110 and loaded to system 10 such that print head 18 is moveably retained by gantry 20, such as disclosed in Swanson, U.S. Publication Nos. 2010/0283172 and 2012/0164256. As shown in FIG.

6C, container portion 110 may include liner 114, rigid module 116, and spool 118, where spool 118 is rotatably mounted within rigid module 116 and retains a supply of filament 52 of the support material. Rigid module 116 may also be secured within liner 114, which is preferably a moisture and/or gas-barrier liner.

Figure 7:
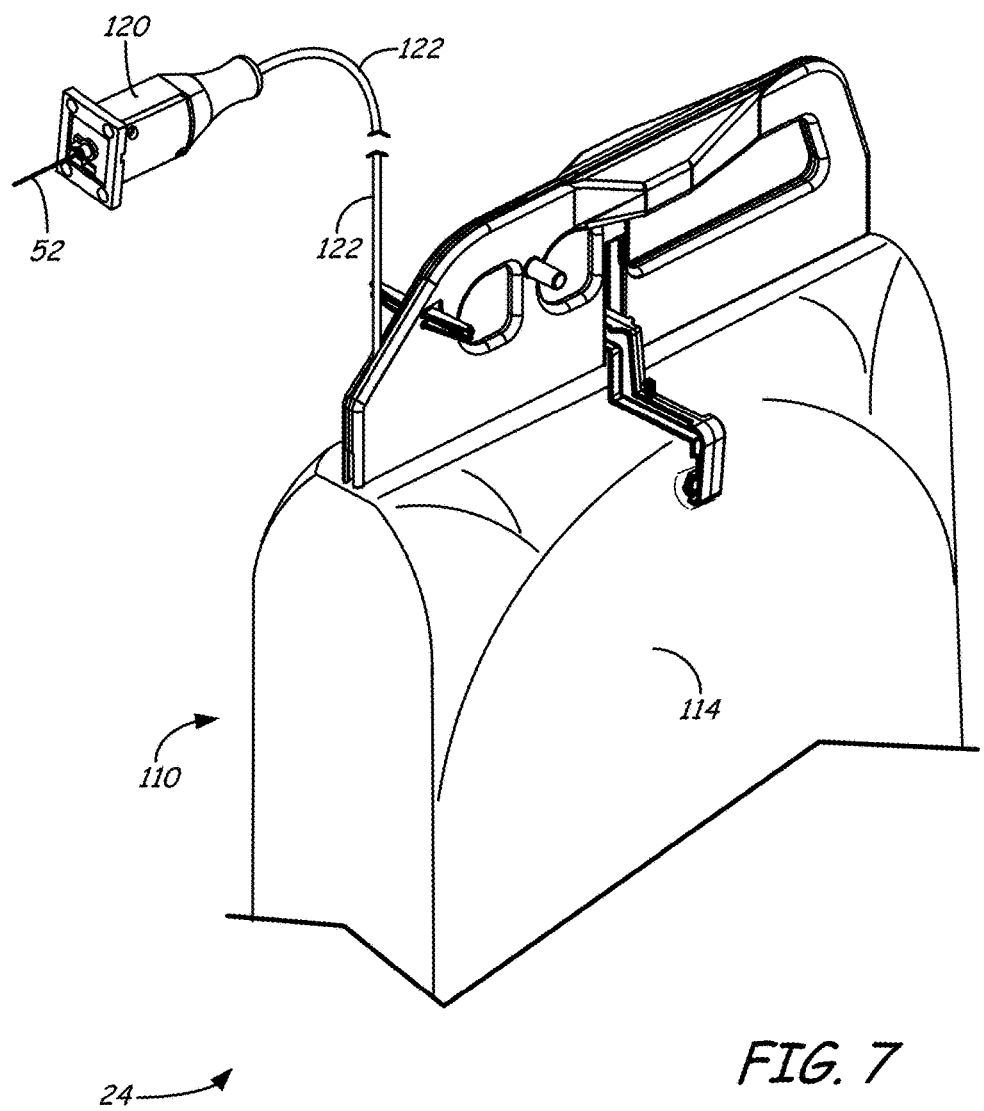
FIG. 7 is a perspective view of a portion of a third embodied consumable assembly for retaining a supply of the support material in filament form, illustrating an integrated coupling adapter and guide tube.

FIG. 7 illustrates another alternative embodiment for consumable assembly 24, which is similar to the embodiment shown in FIGS. 6A-6C, but includes coupling adapter 120 and external guide tube 122, which are configured to engage an external port of system 10 (not shown) for feeding filament 52 to guide tube 28 and print head 18. Preferred devices for consumable assembly 22 in this embodiment include those disclosed in Swanson et al., U.S. Publication No. 2013/0164960.

Figure 8:
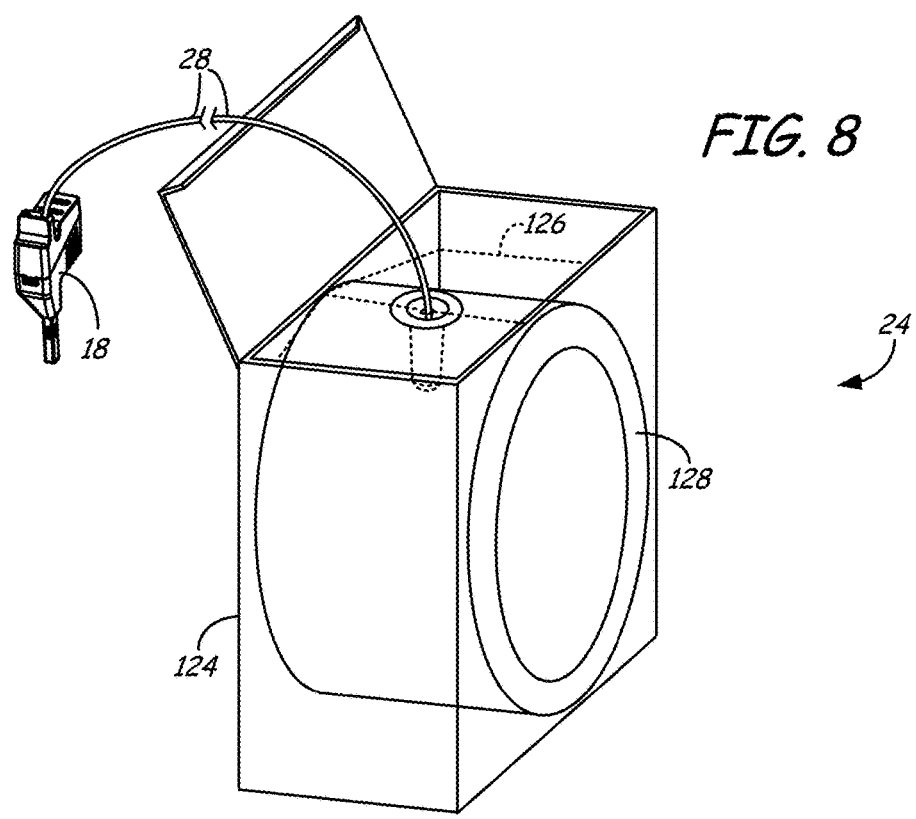
FIG. 8 is a perspective view of a fourth embodied consumable assembly for retaining a supply of the support material in filament form as a spool-less coil, and including an integrated print head and guide tube.

FIG. 8 illustrates yet another alternative embodiment for consumable assembly 24, which is also similar to the embodiment shown in FIGS. 6A-6C, but includes print heat 18, guide tube 28, container portion 124, liner 126, and spool-less coil 128 of filament 52. In this embodiment, guide tube 26 may extend within liner 126 and/or coil 128 to guide successive segments of filament 52 from coil 128 to print head 18. Liner 126 is preferably a moisture and/or gas-barrier liner configured to encase coil 128. Preferred devices for consumable assembly 24 in this embodiment include those disclosed in Swanson et al., U.S. Publication No. 2013/0161432.

Figure 9:
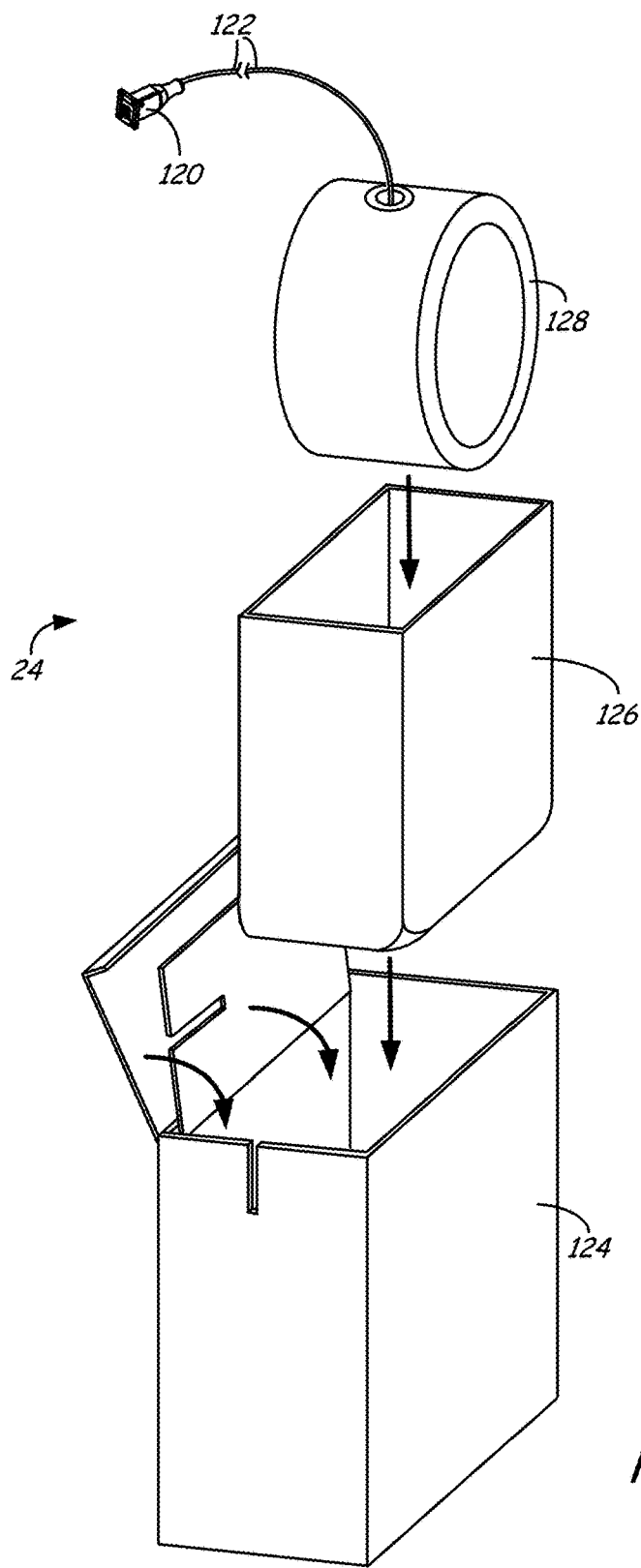
FIG. 9 is a perspective view of a portion of a fifth embodied consumable assembly, illustrating an integrated coupling adapter and guide tube, and a supply the support material in filament form as a coil.

FIG. 9 illustrates another alternative embodiment for consumable assembly 24, which is a combination of the embodiments shown in FIGS. 7 and 8, and includes coupling adapter 120, external guide tube 122, container portion 124, liner 126, and coil 128 of filament 52. Preferred devices for consumable assembly 24 in this embodiment include those disclosed in Swanson et al., U.S. U.S. Publication No. 2013/0161432.

In each of the above-discussed embodiments for consumable assembly 24 (e.g., as shown in FIGS. 5A-9), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In each of the above-discussed embodiments for consumable assembly 24 (e.g., as shown in FIGS. 5A-9), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In addition to the above-discussed extrusion-based additive manufacturing system, which preferably provides the support material in filament form (e.g., filament 52), the support material may alternatively be provided to an extrusion-based additive manufacturing system in powder form for use in an auger-pump print head, such as disclosed in Bosveld et al., U.S. Publication No. 2013/0333798.

In this embodiment, the support material is preferably pelletized or otherwise micronized and/or classified to attain desired powder particle sizes for use in the auger-pump print head. Examples of suitable average particles sizes for the support material powder range from about 15 micrometers to about 125 micrometers, and in some embodiments from about 20 micrometers to about 50 micrometers.

Moreover, the support material may be provided in powder form for use in other powder-powder-based additive manufacturing systems, such as selective laser sintering systems (e.g., systems disclosed in Deckard, U.S. Pat. Nos. 4,863,538 and 5,132,143), powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the support material is also preferably pelletized or otherwise micronized and/or classified to attain desired powder particle sizes for use in the particular system.

In another embodiment, the support material is configured for use in an electrostatographic/electrophotography-based additive manufacturing system to print support structures, in association with a part material used to print 3D parts, with high resolutions and fast printing rates. Examples of suitable electrostatographic/electrophotography-based additive manufacturing systems for this embodiment include those disclosed in Hanson et al., U.S. Publication Nos. 2013/0077996 and 2013/0077997, and Comb et al., U.S. Publication Nos. 2013/0186549 and 2013/0186558.

In this embodiment, the polymeric blend of the base resin and the dispersed resin may also be compounded with one or more charge control agents. Suitable charge control agents for use in the support material include acid metal complexes (e.g., oxy carboxylic acid complexes of chromium, zinc, and aluminum), azo metal complexes (e.g., chromium azo complexes and iron azo complexes), mixtures thereof, and the like. Additional suitable charge control agents for use in the support material include azine-based compounds, and quaternary ammonium salts, mixtures thereof, and the like. The charge control agents preferably constitute from about 0.1% by weight to about 5% by weight of the support material, more preferably from about 0.5% by weight to about 2% by weight, and even more preferably from about 0.75% by weight to about 1.5% by weight, based on the entire weight of the support material.

Furthermore, the support material may also include one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. The flow control agents (e.g., inorganic oxides) preferably constitute from about 0.1% by weight to about 10% by weight of the support material, more preferably from about 0.2% by weight to about 5% by weight, and even more preferably from about 0.3% by weight to about 1.5% by weight, based on the entire weight of the support material.

The support material may also optionally include one or more heat absorbers (e.g., infrared absorbing materials) configured to increase the rate at which the support material is heated when exposed to heaters of a layer transfusion assembly in the electrostatographic/electrophotography-based additive manufacturing systems. In embodiments that incorporate heat absorbers, the heat absorbers (e.g., infrared absorbers) preferably constitute from about 0.5% by weight to about 10% by weight of the support material, more preferably from about 1% by weight to about 5% by weight, and in some more preferred embodiments, from about 2% by weight to about 3% by weight, based on the entire weight of the support material.

For use in electrostatographic/electrophotography-based additive manufacturing systems, the support material has powder form with a controlled average particle size and a narrow particle size distribution, which are preferably similar to or substantially the same as those of the part material. The support material may be manufactured by polymerizing or otherwise providing the thermoplastic copolymer, melt blending the polymeric blend with the charge control agent, and optionally with the heat absorber and/or any additional additives, and then grinding, micronizing and/or classifying the resulting material to attain a powder having desired particle sizes and particle size distributions.

Some additional materials, such as the flow control agent, may be blended to the resulting powder under high shear, if desired. This uniformly distributes, coats, and partially embeds the flow control agent(s) into the individual particles of the support material, without significantly altering the particle size or particle size distribution. The formulated support material may then be filled into a cartridge or other suitable container for use with the electrostatographic/electrophotography-based additive manufacturing system.

As mentioned above, the support material of the present disclosure is preferably engineered for use with a high-performance, thermoplastic part material, such as a polyaryletherketone, polyarylethersulfone, polyetherimide, polyimide, and/or mixtures thereof. Examples of suitable polyaryletherketones for the part material include polyetherketone (PEK), polyetheretherketone (PEEK), polyetherketoneketone (PEKK), polyetheretherketoneketone (PEEKK), polyetherketoneetherketoneketone (PEKEKK), mixtures thereof, and the like.

Examples of suitable polyarylethersulfones for the part material include polyphenylsulfone, polyethersulfone, polysulfone, mixtures thereof, and the like. In some preferred embodiments, the support material of the present disclosure is used in association with a PEI part material, such as a part material consisting essentially of a polyetherimide homopolymer, or that includes a polyetherimide-based resin with one or more additives.

Property Analysis and Characterization Procedures

Various properties and characteristics of the part and support materials described herein may be evaluated by various testing procedures as described below:

1. Glass Transition Temperature and Melt Processing Temperature

The glass transition temperature is determined using the classical ASTM method employing Differential Scanning Calorimetry (DSC) ASTM D3418-12e1 and is reported in degrees Celsius. The test is performed with a DSC analyzer commercially available under the tradename "DSC 6000" from PerkinElmer, Waltham, Mass. under nitrogen at a heating rate of 10° C./min.

The melt processing temperature is determined by using a capillary rheometer commercially available under the tradename "CFT-500D" Flowtester Capillary Rheometer from Shimadzu Corporation, Tokyo, Japan. The test was performed under a 10-kilogram load with a one millimeter die, and at a heating rate of 5° C./min.

2. Thermal Stability

The thermal stability of a thermoplastic polymer is measured by thermal gravimetric analysis (TGA) with a TGA system commercially available under the tradename "Q500" from TA Instruments, New Castle, Del., under nitrogen, and at a heating rate of 10° C./min. The thermal stability of the support material may be referenced by a weight percentage of thermal degradation over a given exposure duration.

For example, the thermal stability of a given thermoplastic polymer may be characterized such that less than 10% by weight of the thermoplastic polymer thermally degrades when the thermoplastic polymer is exposed to a given melt processing temperature (e.g., 400° C.) for a 10-second duration, and/or to given heated chamber temperature (e.g., 200° C.) for a 50-hour duration. Other weight percents may also be referenced, such as less than 5% by weight, less than 1% by weight, and less than 0.5% by weight, and the like; any suitable melting processing duration may be referenced, such as 5 seconds, 10 seconds, 30 seconds, 1 minute, 5 minutes, 10 minutes, 30 minutes, and the like; and any suitable heated chamber temperature duration may be referenced, such as 1 hour, 5 hours, 10 hours, 25 hours, 50 hours, 75 hours, and the like. Combinations of these weight percent and duration references may also be used.

3. Relative Adhesion Test

The relative adhesions of the support materials to various part materials was measured by testing the tensile load required to cause delamination of the materials at the interfacial locations. The test involves printing a test bar of the part and support materials, where layers of the part material are printed on top of the layers of the support material, and where the test bar has a 15-inch horizontal length, a 0.5-inch vertical height, and a 0.5-inch horizontal width. The test bar includes a notch in the support material layers at a mid-section of the bar.

An increasing load is the applied to the mid-section of the test bar, at the location of the notch, at a rate of 0.05-inches/minute to measure the load required to cause yielding (i.e., delamination) of the part material layers from the support material layers. This simulates the tensile loads required to break the support structures apart from the 3D parts. The results from the test are normalized by the average moduli of the part and support material pairs to compare material pairings on similar terms.

EXAMPLES

The present disclosure is more particularly described in the following examples that are intended as illustrations only, since numerous modifications and variations within the scope of the present disclosure will be apparent to those skilled in the art.

1. Example 1

A support material of Example 1 included a polymer blend of 90% by weight of a low molecular-weight polyethersulfone (PES) (ULTRASON E1010 from BASF Corporation, Ludwigshafen, Germany) and 10% by weight of a blend of polyphenyleneoxide and polystyrene (PPO/PS) ("NORYL 731" from SABIC Innovative Plastics, Pittsfield, Mass.). The PES base resin and the PPO/PS dispersed resin were substantially immiscible with each other, as shown by separate and distinct glass transition temperatures in a DSC plot, which were at 151° C. (PPO/PS) and at 221° C. (PES).

The support material was produced in filament form and used to print support structures in an extrusion-based additive manufacturing system commercially available from Stratasys, Inc., Eden Prairie, Minn. under the trademarks "FDM" and "FORTUS 400mc". During the printing operations, the support material filament was melted in the print head at a temperature of about 385° C. extruded as a series of roads in a layer-by-layer manner to print support structures in a heated build chamber maintained at about 200° C.

A part material filament of a polyetherimide (PEI) homopolymer ("ULTEM 1010" from SABIC Innovative Plastics, Pittsfield, Mass.) was printed in coordination with the support material to produce 3D parts supported by the support structures. The PEI part material and the PES base resin were substantially miscible. In comparison, the PEI part material and the PPO/PS dispersed resin were substantially immiscible.

During the printing operations, the part material filament was melted in the print head at a temperature of about 400° C. extruded as a series of roads in a layer-by-layer manner to print 3D parts in the heated build chamber. The 3D parts produced from the PEI part material had good control of dimensional accuracy, good strength, and good appearance. The support material did not show any visible signs of thermal degradation, and maintained good adhesion to the PEI part material during the printing operations. Furthermore, the support structures were found to be relatively easily removed by mechanical means alone to reveal finished 3D parts.

As discussed above, this combination of good adhesion during the printing operations and easy removal is believed to be caused by the immiscible blend of the base resin and the dispersed resin, which created an "islands in the sea" effect. The discrete regions of the dispersed PPO/PS resin were believed to function as points of weakness in the otherwise good adhesion between the PES base resin and the PEI part material, which facilitated interfacial crack propagations within the support structures, and between the 3D parts and the support structures.

2. Example 2

A support material of Example 2 included a polymer blend of 90% by weight of a medium molecular-weight polyethersulfone (PES)("ULTRASON E2010" from BASF Corporation, Ludwigshafen, Germany) and 10% by weight of a polysulfone (PSU) ("UDEL P3703" from Solvay Specialty Polymers). The PES base resin and the PSU dispersed resin were substantially immiscible with each other, as shown by separate and distinct glass transition temperatures in a DSC plot, which were at 185° C. (PSU) and at 225° C. (PES).

The support material was produced in filament form and used to print support structures in an extrusion-based additive manufacturing system commercially available from Stratasys, Inc., Eden Prairie, Minn. under the trademarks "FDM" and "FORTUS 900mc". During the printing operations, the support material filament was melted in the print head at a temperature of about 400° C. extruded as a series of roads in a layer-by-layer manner to print support structures in a heated build chamber maintained at about 205° C.

A part material filament of a polyetherimide (PEI) homopolymer ("ULTEM 1010" from SABIC Innovative Plastics, Pittsfield, Mass.) was printed in coordination with the support material to produce 3D parts supported by the support structures. The PEI part material and the PES base resin were substantially miscible. In comparison, the PEI part material and the PSU dispersed resin were substantially immiscible.

During the printing operations, the part material filament was melted in the print head at a temperature of about 400° C. extruded as a series of roads in a layer-by-layer manner to print 3D parts in the heated build chamber. The 3D parts produced from the PEI part material exhibited exceptional dimensional accuracies and strengths, as well as good aesthetics.

The support structures were found to be relatively easily removed by mechanical means alone to reveal finished 3D parts. As such, this polymer blend of the PES base resin and the PSU dispersed resin is also believed to have created an "islands in the sea" effect, as discussed above, which facilitated interfacial crack propagations within the support structures, and between the 3D parts and the support structures.

The support material also did not show any visible signs of thermal degradation, and maintained good adhesion to the PEI part material during the printing operations. In fact, the support material was found to exhibit good stability up to about 500° C., as measured by thermal gravimetric analysis (TGA). Furthermore, after 96 hours aging at 195° C., the support material exhibited an average tensile strength of about 7000 pounds/square-inch (psi), an average percent strain at break of about 2.4%, and a modulus of elasticity of about 316,000 psi, as measured pursuant to ASTM D638-10. This indicated that the support structures retained good mechanical properties after aging at extreme temperature for long periods of time.

3. Example 3

A support material of Example 3 included a polymer blend of 65% by weight of a polysulfone (PSU) ("UDEL P3703" from Solvay Specialty Polymers) and 35% by weight of a polyetherimide (PEI) ("ULTEM 1000" from SABIC Innovative Plastics, Pittsfield, Mass.). The PSU base resin and the PEI dispersed resin were substantially immiscible with each other, as shown by separate and distinct glass transition temperatures in a DSC plot, which were at 185° C. (PSU) and at 215° C. (PEI).

The support material was produced in filament form and used to print support structures in an extrusion-based additive manufacturing system commercially available from Stratasys, Inc., Eden Prairie, Minn. under the trademarks "FDM" and "FORTUS 900mc". During the printing operations, the support material filament was melted in the print head at a temperature of about 420° C. extruded as a series of roads in a layer-by-layer manner to print support structures in a heated build chamber maintained at about 180° C.

A part material filament of a polyetherimide (PEI) blend ("ULTEM 9085" from SABIC Innovative Plastics, Pittsfield, Mass.) was printed in coordination with the support material to produce 3D parts supported by the support structures. In comparison to the support materials of Examples 1 and 2, in the support material of Example 3, the PSU base resin was substantially immiscible with the PEI part material, and the PEI dispersed resin was substantially miscible with the PEI part material. This was believed to be achievable because of the compositional similarities between the PEI part material and the PEI dispersed resin, which provided excellent adhesion and affinity between the two resins.

During the printing operations, the part material filament was melted in the print head at a temperature of about 380° C. extruded as a series of roads in a layer-by-layer manner to print 3D parts in the heated build chamber. The resulting 3D parts exhibited better control of out of plane curl and warping were. Furthermore, larger 3D parts were successfully printed with fewer dimensional inaccuracies due to curl when printed in coordination with the support material of Example 3.

Support removal was also still accomplished using mechanical means, requiring slightly more tensile loads compared to a support structured printed from a polysulfone (PSU) homopolymer. This higher removal force was believed to be due to the good adhesion between the PEI part material and the PEI dispersed resin, which was experimentally found to require about 35% higher tensile loads (compared to the PSU homopolymer) when measured with the Relative Adhesion Test discussed above.

4. Relative Adhesion Testing Results

The support materials of Examples 1 and 2 were also measured for relative adhesions to a part material of a polyetherimide (PEI) homopolymer ("ULTEM 1010" from SABIC Innovative Plastics, Pittsfield, Mass.) using the Relative Adhesion Test discussed above. In addition, relative adhesions of support materials of Comparative Examples A-C were also measured in the same manner for comparison purposes. The support material of Comparative Example A was a commercially available break away support material for use with a PPSF part material, each available from Stratasys, Inc., Eden Prairie, Minn. The support material of Comparative Example B was a commercially available PSU break away support material for use with a PEI part material ("ULTEM 9085"), each available from Stratasys, Inc., Eden Prairie, Minn. The support material of Comparative Example C was a polyethersulfone (PES) ("ULTRASON E2010" from BASF Corporation, Ludwigshafen, Germany).

Table 1 lists the relative adhesion results for each support material. As shown, the support materials of Examples 1 and 2 exhibited suitable levels of adhesion, allowing the support structures to function as anchors for the 3D parts, while also being easily removed due to the "islands in the sea" effect. As discussed above, this facilitated interfacial crack propagations within the support structures, and between the 3D parts and the support structures.

TABLE 1

| Example | Support Material Polymer(s) | Relative Adhesion |
| --- | --- | --- |
| Example 1 | 90% PES/10% (PPO/PS) | 3.1 |
| Example 2 | 90% PES/10% PSU | 2.4 |
| Comparative Example A | PPSF | 4.4 |
| Comparative Example B | PSU | 2.0 |
| Comparative Example C | PES | 3.6 |

5. Comparative Example D

A support material of Comparative Example D included a ternary polymer blend of 46% by weight percent of a medium molecular-weight polyphenylsulfone (PPSF) ("RADEL R5600" from Solvay Specialty Polymers), 27% by weight of a low molecular-weight polysulfone (PSU) ("UDEL P3703" from Solvay Specialty Polymers), and 27% by weight of an amorphous polyamide (PA) block copolymer ("TR60" from EMS-Chemie, Inc., Sumter, S.C.). The PPSF and the PSU were substantially miscible with each other to provide the base resin, which was substantially immiscible with the PA dispersed resin, as shown by separate and distinct glass transition temperatures in a DSC plot, which were at 187° C. (PA) and at 211° C. (PPSF/PSU).

The support material was produced in filament form and used to print support structures in an extrusion-based additive manufacturing system commercially available from Stratasys, Inc., Eden Prairie, Minn. under the trademarks "FDM" and "FORTUS 900mc". During the printing operations, the support material filament was melted in the print head at a temperature of about 370° C. extruded as a series of roads in a layer-by-layer manner to print support structures in a heated build chamber maintained at about 200° C.

A part material filament of a medium molecular-weight polyphenylsulfone (PPSF) ("RADEL R5600" from Solvay Specialty Polymers) was printed in coordination with the support material to produce 3D parts supported by the support structures. The PPSF part material and the PPSF/PSU base resin were substantially miscible. In comparison, the PPSF part material and the PA dispersed resin were substantially immiscible. During the printing operations, the part material filament was melted in the print head at a temperature of about 400° C. extruded as a series of roads in a layer-by-layer manner to print 3D parts in the heated build chamber.

It was found that the support material of Comparative Example D, though based on PPSF and PSU resins, did not maintain adequate dimensional integrity at the required annealing oven temperature, and was pulled-up with the out of plane curling tendencies of the PPSU resin. Furthermore, the support material turned brittle and discolored rapidly after aging in the heated build chamber. Thermal gravimetric analysis indicated rapid decomposition, likely of the polyamide component, beginning at temperatures over 350° C.

Tensile strength testing of coupons (of the support material) aged just 60 hours in the heated build chamber after a build showed part properties lower than those typically associated with 3D parts printed from acrylonitrile-butadiene-styrene (ABS) or polylactic acid (PLA) materials, at just 4000 psi and 1.25% elongation at break. This indicated rapid and severe thermal degradation of the support material, suggesting it was not well suited for use with high-performance part materials, such as PPSF materials.

6. Comparative Example E

The support material of Comparative Example D was also printed in coordination with a second part material filament of a polyetherimide (PEI) homopolymer ("ULTEM 1010" from SABIC Innovative Plastics, Pittsfield, Mass.), using the same procedure as discussed above for Comparative Example A. In this case, the PEI part material and the PPSF/PSU base resin were substantially miscible, and the PEI part material and the PA dispersed resin were substantially immiscible.

During the printing operations, the part material filament was melted in the print head at a temperature of about 400° C. extruded as a series of roads in a layer-by-layer manner to print 3D parts in the heated build chamber. The support material in this comparative example also exhibited the same curling tendencies and thermal degradation issues. This further suggests that the support material was not well suited for use with high-performance part materials, such as PEI materials.

7. Curl Testing Results

The support materials of Example 2 and Comparative Examples D and E were also qualitatively and quantitatively tested for curl resistance. The quantitative test involve printing an elongated 3D part on the support structure and measuring the out-of-plane curl of the 3D part at the endpoints of the 3D part, relative to a hypothetical plane running through the centerline of the 3D part. The support structures and 3D parts were printed as discussed above in their examples, where the heated build chamber maintained at about 205° C.

Figure 10:
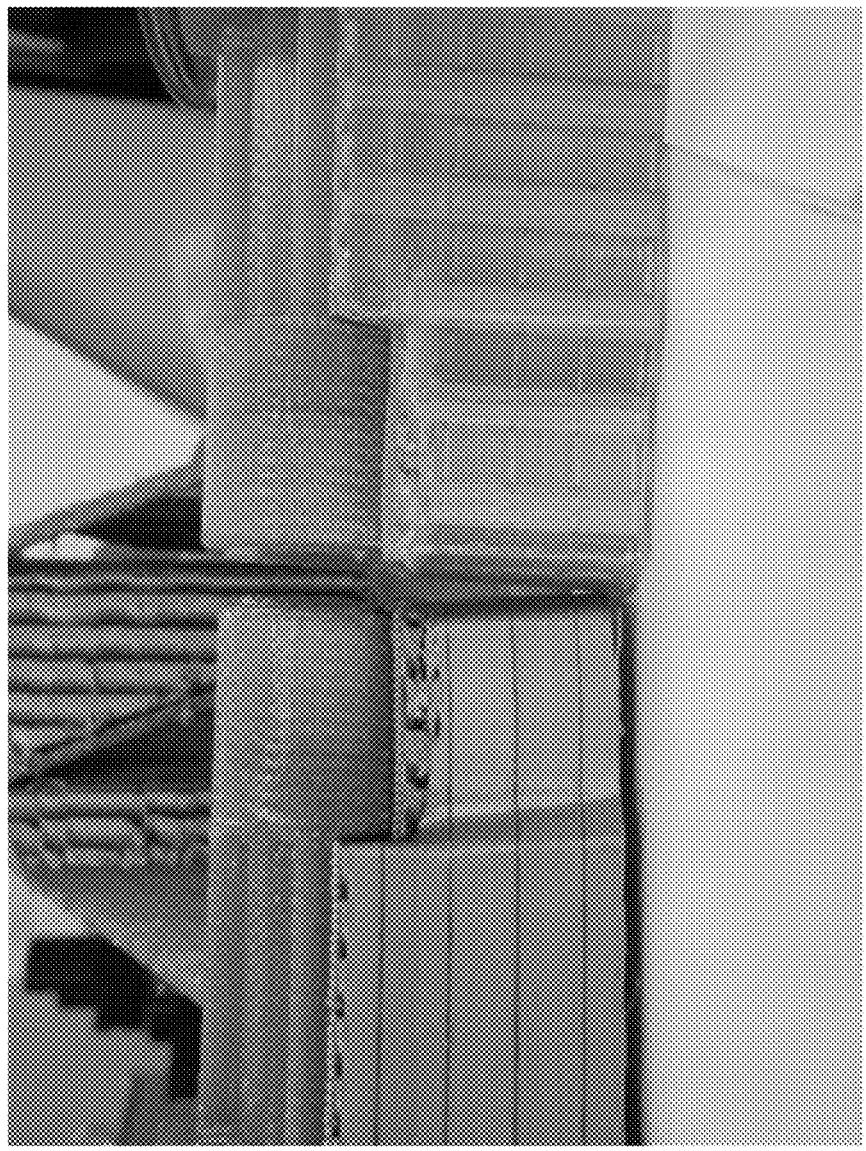
FIG. 10 is a photograph of an example support material of the present disclosure and a comparative support material.

The support material of Example 2 exhibited an average curl of 3.8 mils. In comparison, the support materials of Comparative Examples D and E respectively exhibited average curling of 12.5 mils and 10.8 mils. This is further qualitatively illustrated in FIG. 10, where the 3D part and support structure of Example 2 are shown on the right side of the view, and the 3D part and support structure of Comparative Example B are shown on the right side of the view.

As can be seen, the support material of Example 2 maintained good dimensional stability for supporting the 3D part, as well as a relatively clear appearance due to the thermal stability of the support material. In comparison, the support material of Comparative Example B exhibited significant curling and distortions, as well as a visually-apparent discoloration and opaqueness. This discoloration is believed to be due to the oxidation of the PA dispersed resin, and the opaqueness is believed to be due to the immiscibility of the PSU/PPSU and the PA dispersed resin.

Although the present disclosure has been described with reference to preferred embodiments, workers skilled in the art will recognize that changes may be made in form and detail without departing from the spirit and scope of the disclosure.

The invention claimed is:

1. A support material for use in an additive manufacturing system to print a support structure for a three-dimensional part printed from a polyethermide part material, the support material comprising:
   a base resin comprising one or more first polyarylethersulfones, wherein the base resin is substantially miscible with the polyethermide part material and has a glass transition temperature that ranges from about 205° C. to about 225° C.; and
   a dispersed resin comprising one or more thermoplastic polymers comprises one or more second polyarylethersulfones, a blend of a polyphenyleneoxide and a polystyrene, mixtures thereof, or a polyetherimide, wherein the dispersed resin is substantially immiscible with the base resin such that the support material has non-uniform island in a sea configuration, wherein the base resin constitutes from about 85% to about 95% by weight of the base resin and the dispersed resin;
   wherein the base resin and the dispersed resin each have a thermal stability such that less than 10% by weight of either of the base resin or the dispersed resin thermally degrades when the support material is exposed to 350° C. for a 5-minute duration; and
   wherein the support material is configured for use in the additive manufacturing system as a filament or powder that is configured to be melted in and extruded from a print head retained by the additive manufacturing system and for printing the support structure from the support material in coordination with printing of the three-dimensional part from the part material in a layer-by-layer manner and have a relative adhesion with the polyethermide part material in the range of 2.4 and 3.1, such that the non-uniform islands of dispersed resin sufficiently disrupt the bonding between the polyethermide part material and the base resin to allow the support structure to be separated from the three-dimensional part with a force.

2. The support material of claim 1, wherein the one or more first polyarylethersulfone of the base resin comprises a polysulfone.

3. The support material of claim 1, wherein the one or more first polyarylethersulfone comprises a polyethersulfone.

4. The support material of claim 2, wherein the one or more thermoplastic polymers of the dispersed resin comprises a polysulfone or a blend of a polyphenyleneoxide and a polystyrene and mixtures thereof.

5. The support material of claim 1, wherein the one or more first polyarylethersulfones of the base resin comprise a polysulfone, and wherein the one or more thermoplastic polymers of the dispersed resin comprise a polyetherimide.

6. A support material for use in an additive manufacturing system to print a support structure for a three-dimensional part printed from a polyethermide part material, the support material comprising:
   85% to about 95% by weight a first polyarylethersulfone having a glass transition temperature ranging from about 205° C. to about 225° C., wherein the first polyarylethersulfone is substantially miscible with the polyethermide part material; and
   a second polyarylethersulfone that is substantially immiscible with first polyarylethersulfone and the polyethermide part material such that the support material has a non-uniform island in a sea configuration;
   wherein the support material is configured for use in the additive manufacturing system as a filament or powder that is configured to be melted in and extruded from a print head retained by the additive manufacturing system and for printing the support structure from the support material in coordination with printing of the three-dimensional part from the part material in a layer by layer manner and have a relative adhesion with the polyethermide part material in the range of 2.4 and 3.1, such that the non-uniform islands of dispersed resin sufficiently disrupt the bonding between the part material and the base resin to allow the support structure to be separated from the three-dimensional part with a force.

7. The support material of claim 6, wherein the first polyarylethersulfone comprises a polyethersulfone.

8. The support material of claim 6, wherein the second polyarylethersulfone comprises a polysulfone.

9. The support material of claim 6, wherein the support material is substantially free of polymers that thermally degrade by more than 5% by weight when exposed to 350° C. for a 5-minute duration and to 200° C. for a 50-hour duration.

10. The support material of claim 6, wherein the second polyarylethersulfone constitutes from about 5% by weight to about 15% by weight of the support material.

11. A method for printing a three-dimensional part with an additive manufacturing system, the method comprising:
   providing a polyethermide part material having a first glass transition temperature;
   providing a support material having a base resin comprising 85% to about 95% by weight a first polyarylethersulfone having a glass transition temperature ranging from about 205° C. to about 225° C., wherein the first polyarylethersulfone is substantially miscible with the polyethermide part material and a second polyarylethersulfone that is substantially immiscible with first polyarylethersulfone and the polyethermide part material such that the support material has an non-uniform island in a sea configuration, wherein the base resin is substantially miscible with the polyethermide part material and, wherein the support material is configured for use in the additive manufacturing system as a filament or powder that is configured to be melted in and extruded from a print head retained by the additive manufacturing system;

heating a chamber of the additive manufacturing system to at least 185° C.;

melting the support material with a melt processing temperature greater than about 350° C.;

forming layers of the three-dimensional part from the polyethermide part material;

forming layers of a support structure from the molten support material in the heated chamber wherein as the layers of support structure are formed the non-uniform islands of the second polyarylsulfone form areas at an interface with the printed layer of the three-dimensional part to weaken the bond between the three-dimensional part and the layers of support material and have a relative adhesion between the support material the polyethermide part material in the range of 2.4 and 3.1;

removing the three-dimensional part and the support structure from the chamber, wherein less than 10% by weight of the support material of the removed support structure is thermally degraded; and separating the support structure from the removed three-dimensional part utilizing a force.

12. The method of claim 11, wherein the first polyarylethersulfone comprises a polyethersulfone and the second polyarylethersulfone comprises a polysulfone.

13. The method of claim 11, wherein less than 5% by weight of the support material of the removed support structure is thermally degraded.

14. The method of claim 11, wherein less than 1% by weight of the support material of the removed support structure is thermally degraded.

* * * * *

UNITED STATES PATENT AND TRADEMARK OFFICE
CERTIFICATE OF CORRECTION

PATENT NO. : 10,059,053 B2
APPLICATION NO. : 14/532485
DATED : August 28, 2018
INVENTOR(S) : Vittorio L. Jaker and Luke M. B. Rodgers Page 1 of 2

It is certified that error appears in the above-identified patent and that said Letters Patent is hereby corrected as shown below:

On the Title Page

(56) References
U.S. Patent Documents
Delete "5,863,855", insert --5,863,885--.

In the Claims

In Claim 1
Column 25, Line 33, delete "polyethermide", insert --polyetherimide--.
Column 25, Line 37, delete "polyethermide", insert --polyetherimide--.
Column 25, Lines 45-46, before "non-uniform", insert --a--.
Column 25, Line 62, delete "polyethermide", insert --polyetherimide--.
Column 25, Line 65, delete "polyethermide", insert --polyetherimide--.

In Claim 6
Column 26, Line 17, delete "polyethermide", insert --polyetherimide--.
Column 26, Line 23, delete "polyethermide", insert --polyetherimide--.
Column 26, Lines 25-26, delete "polyethermide", insert --polyetherimide--.
Column 26, Line 34, before "part material", insert --polyetherimide--.
Column 26, Line 36, delete "polyethermide", insert --polyetherimide--.
Column 26, Line 38, before "part material", insert --polyetherimide--.

In Claim 11
Column 26, Line 56, delete "polyethermide", insert --polyetherimide--.
Column 26, Line 63, delete "polyethermide", insert --polyetherimide--.
Column 26, Line 65, delete "polyethermide", insert --polyetherimide--.
Column 27, Line 1, delete "polyethermide", insert --polyetherimide--.
Column 27, Line 12, delete "polyethermide", insert --polyetherimide--.

Signed and Sealed this
Seventeenth Day of September, 2019

Andrei Iancu
*Director of the United States Patent and Trademark Office*

Column 28, Line 1, after "material", insert --and--.
Column 28, Line 2, delete "polythermide", insert --polyetherimide--.